US010571932B2

(12) United States Patent
DeBitetto et al.

(10) Patent No.: US 10,571,932 B2
(45) Date of Patent: *Feb. 25, 2020

(54) NAVIGATION SYSTEM FOR A DRONE

(71) Applicant: Top Flight Technologies, Inc., Malden, MA (US)

(72) Inventors: Paul A. DeBitetto, Concord, MA (US); Long N. Phan, Winchester, MA (US); Scott Rasmussen, Andover, MA (US); Sanjay Sarma, Malden, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,984

(22) Filed: Jan. 23, 2019

(65) Prior Publication Data
US 2019/0155314 A1 May 23, 2019

Related U.S. Application Data

(63) Continuation of application No. 16/029,383, filed on Jul. 6, 2018, now Pat. No. 10,198,011.
(Continued)

(51) Int. Cl.
*G05D 1/10* (2006.01)
*B64C 39/02* (2006.01)
(Continued)

(52) U.S. Cl.
CPC ............ *G05D 1/101* (2013.01); *B64C 39/024* (2013.01); *B64D 27/02* (2013.01); *G01C 21/005* (2013.01);
(Continued)

(58) Field of Classification Search
CPC ........ G05D 1/101; G06N 3/08; G01C 21/005; B64D 27/02; B64D 2027/026;
(Continued)

(56) References Cited

U.S. PATENT DOCUMENTS 9,764,837 B2 * 9/2017 Phan ................... B64D 27/02
2015/0226559 A1 8/2015 Waite et al.
(Continued)

FOREIGN PATENT DOCUMENTS

CN 102788579 11/2012
WO WO 2017/100579 6/2017

OTHER PUBLICATIONS

Konam, "Vision-Based Navigation and Deep-Learning Explanation for Autonomy." In: The Robotics Institute School of Computer Science, Carnegie Mellon University, May 2017 [online] [retrieved on Nov. 1, 2018] Retrieved from the Internet <URL: https://www.ri.cmu.edu/publications/vision-based-navigation-and-deep-learning-explanation-for-autonomy/.
(Continued)

*Primary Examiner* — Thomas Ingram
(74) *Attorney, Agent, or Firm* — Fish & Richardson P.C.

(57) ABSTRACT

This document describes an unmanned aerial vehicle (UAV) configured to navigate an unmanned aerial vehicle highway. The UAV includes a navigation system that includes a sensor, configured to gather environmental data, and a computing system configured to navigate the UAV. The computing system compares the environmental data to a specified data signature in the one or more spectra and determines a position of the unmanned aerial vehicle in the unmanned aerial vehicle highway. The UAV includes a hybrid generator system including an engine configured to generate mechanical energy and a generator motor coupled to the engine and configured to generate electrical energy from the mechanical energy generated by the engine. The UAV includes a rotor motor configured to drive a propeller to rotate. The navigation system is powered by the electrical energy generated by the generator motor.

21 Claims, 24 Drawing Sheets

Related U.S. Application Data

(60) Provisional application No. 62/529,081, filed on Jul. 6, 2017.

(51) Int. Cl.
  *B64D 27/02* (2006.01)
  *G01C 21/00* (2006.01)
  *G06N 3/08* (2006.01)

(52) U.S. Cl.
  CPC .. *B64C 2201/024* (2013.01); *B64C 2201/042* (2013.01); *B64C 2201/044* (2013.01); *B64C 2201/12* (2013.01); *B64D 2027/026* (2013.01); *G06N 3/08* (2013.01)

(58) Field of Classification Search
  CPC .............. B64C 39/24; B64C 2201/044; B64C 2201/042; B64C 2201/12; B64C 2201/024
  See application file for complete search history.

(56) References Cited

U.S. PATENT DOCUMENTS

| | | |
|---|---|---|
| 2016/0003631 A1 | 1/2016 | Lucent |
| 2016/0140851 A1 | 5/2016 | Levy et al. |
| 2016/0341823 A1 | 11/2016 | Gerry et al. |
| 2016/0376005 A1 | 12/2016 | Phan et al. |
| 2017/0142596 A1 | 5/2017 | Priest et al. |
| 2019/0011934 A1 | 1/2019 | DeBitetto et al. |

OTHER PUBLICATIONS

International Search Report and Written Opinion for App. Ser. No. PCT/US18/41105, dated Oct. 30, 2018, 17 pages.

* cited by examiner

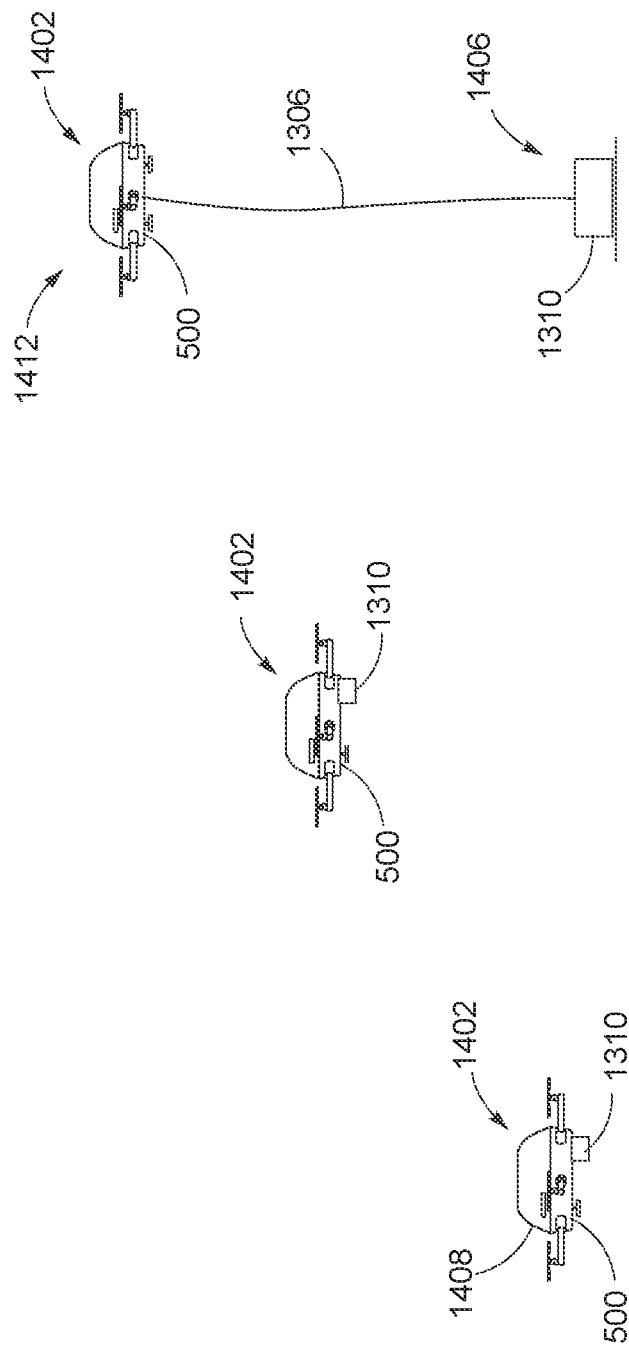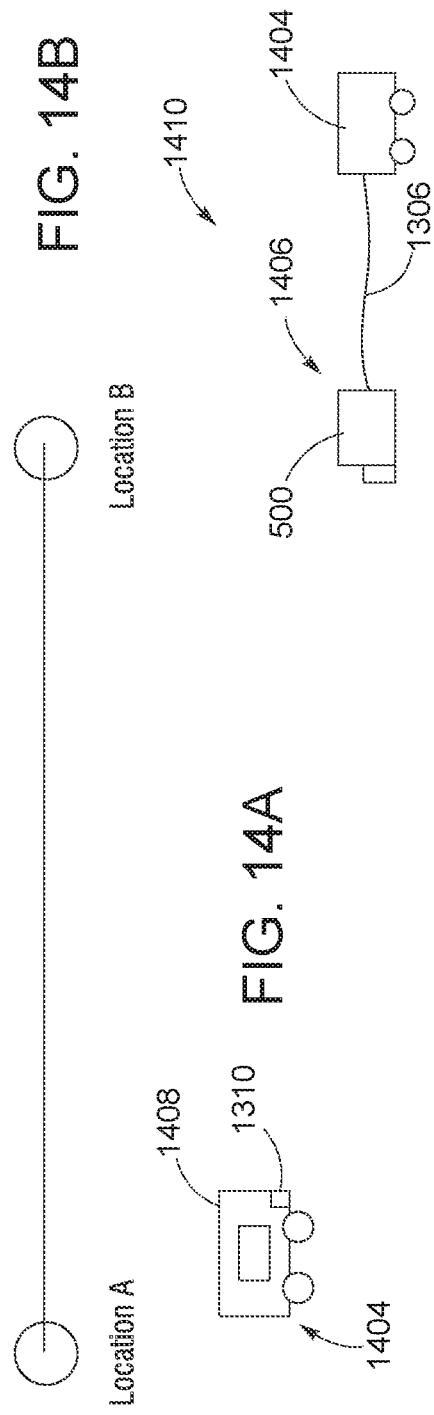

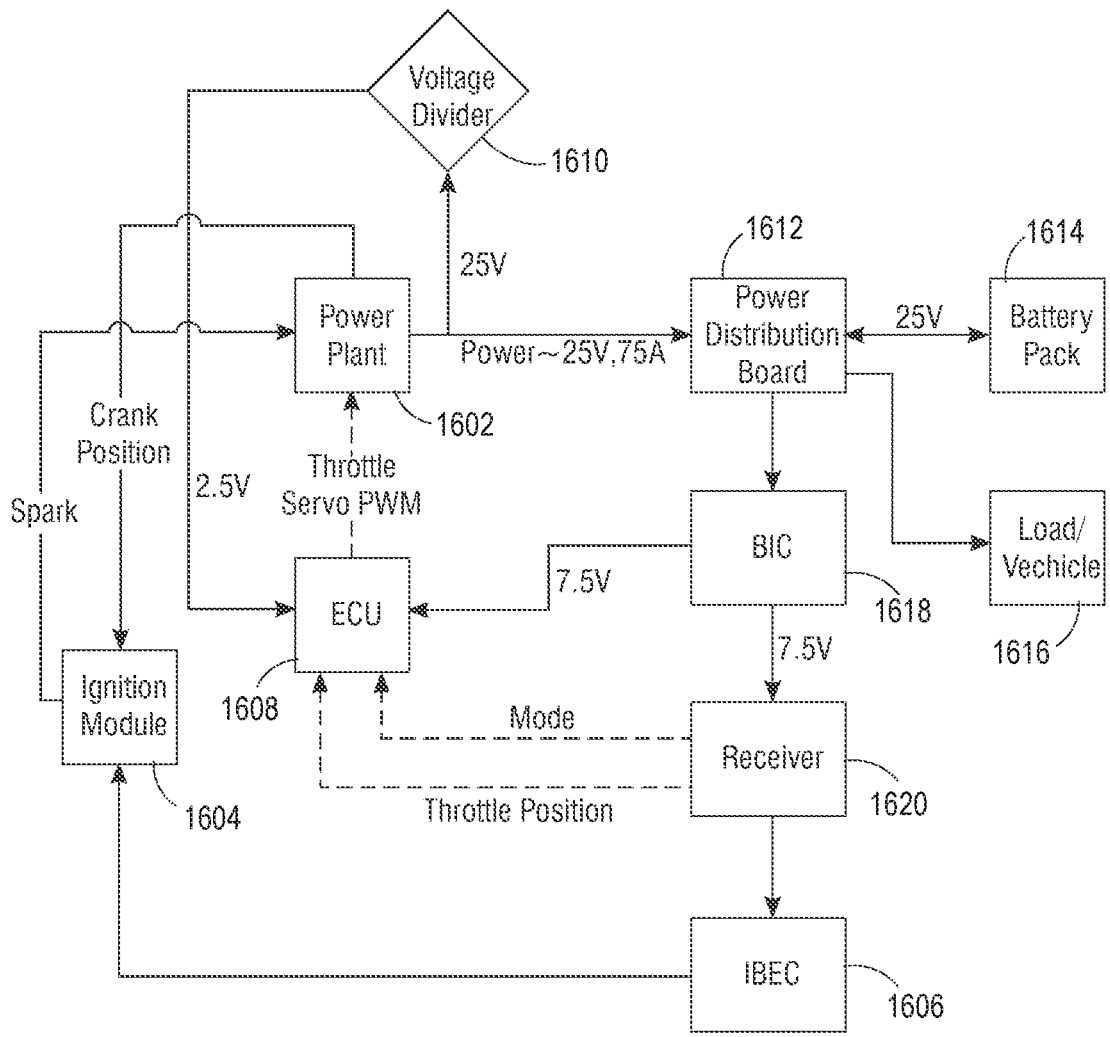
FIG. 16
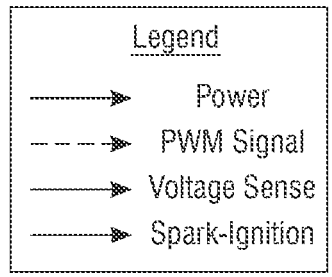

NAVIGATION SYSTEM FOR A DRONE

CLAIM OF PRIORITY

This application claims priority to U.S. patent application Ser. No. 16/029,383, filed on Jul. 6, 2018, which claims the benefit of priority under 35 U.S.C. § 119(e) to U.S. Patent Application Ser. No. 62/529,081, filed on Jul. 6, 2017, the entire contents of which are hereby incorporated by reference.

TECHNICAL FIELD

This disclosure relates to a navigation system for a drone.

BACKGROUND

Many of today's transportation systems carry with them a dedicated infrastructure that enable vehicles to safely navigate their routes. For example, highways have exit numbers and signs, railways have signaling stations, manned aircraft have the air-traffic management system etc. Although GPS has superseded most others as the dominant navigation system across most of today's transportation systems, there are well known vulnerabilities. Many transportation systems thus maintain backups to GPS.

SUMMARY

The UAV described herein can efficiently utilize elements of existing transportation, communication, and energy infrastructure systems. The UAV is configured to plan and navigate over long distances, safely and reliably, such as within the U.S. and abroad, without establishing a new drone-specific navigation infrastructure.

An integrated navigation approach leverages known elements and signatures of existing national infrastructure that can be correlated with real-time sensor readings and onboard computing carried by the drone to realize accurate and robust navigation with or without GPS.

The UAV described herein includes several advantages. Multi-spectral imaging, such as using thermal, infrared, radio, magnetic, and visible light imaging, facilitates localization and path planning of the UAV along corridors of UAV highways. If one or more sensors become inoperable, such as if GPS outages occur, the UAV can still safely and reliably autonomously navigate the UAV highway. Multi-spectral analysis of the UAV highway enables the UAV to build a local map of the UAV highway and correlate that local map to pre-existing maps and known signatures that improves navigational accuracy over intrinsic GPS inaccuracies.

The UAV is configured to navigate using existing infrastructure, such as power lines, enabling this infrastructure to be used as a safe and effective drone highway. For example, power lines are mapped across the continental U.S., and these maps can serve as pre-loaded global maps used for autonomous navigation by the UAV. Power lines are relatively isolated, and airspace above the power lines is clear. Additionally, power lines have distinguishing data signatures in many spectra, such as thermal, infrared and visible light, and can be detected by employing various techniques. These advantages translate to other forms of infrastructure, such as train tracks, pipelines, automobile highways etc.

The computing power that is required by the computing system of the navigation system is provided by an electrical generator on board the UAV. The electrical generator (which can be a part of a hybrid power system) provides enough power to support computation-intensive navigation techniques described herein (including those using machine learning, mesh communication, simultaneous localization and mapping, and so forth). Further, the power system on board the UAV powers the sensors that gather the data signatures in the many spectra described above. The power system on board the UAV thus enables the navigation techniques for using a drone highway system described herein.

The unmanned aerial vehicle (UAV) includes a navigation system that includes a sensor configured to gather environmental data in one or more spectra. The navigation system includes a computing system configured to: compare the environmental data to a specified data signature in the one or more spectra, the specified data signature being associated with an unmanned aerial vehicle highway; and determine, based on comparing the environmental data to the specified data signature, a position of the unmanned aerial vehicle in the unmanned aerial vehicle highway. The UAV includes a hybrid generator system. The hybrid generator system includes an engine configured to generate mechanical energy and a generator motor coupled to the engine and configured to generate electrical energy from the mechanical energy generated by the engine. The UAV includes and at least one rotor motor configured to drive at least one propeller of the unmanned aerial vehicle to rotate, where the at least one rotor motor is powered by the electrical energy generated by the generator motor, and where the navigation system is powered by the electrical energy generated by the generator motor.

In some implementations, the unmanned aerial vehicle (UAV) includes a navigation system that includes a sensor configured to gather environmental data in one or more spectra. The navigation system includes a computing system configured to: compare the environmental data to a specified data signature in the one or more spectra, the specified data signature being associated with an unmanned aerial vehicle highway; and determine, based on comparing the environmental data to the specified data signature, a position of the unmanned aerial vehicle in the unmanned aerial vehicle highway. The UAV includes a generator system. The generator system includes a generator motor coupled to the engine and configured to generate electrical energy. The UAV includes and at least one rotor motor configured to drive at least one propeller of the unmanned aerial vehicle to rotate, where the at least one rotor motor is powered by the electrical energy generated by the generator motor, and where the navigation system is powered by the electrical energy generated by the generator motor.

In some implementations, the sensor of the navigation system comprises a thermal sensor, and the one or more spectra comprise thermal emissions of the unmanned aerial vehicle highway. In some implementations, the navigation system comprises one or more of a camera, a ranging sensor, an infrared sensor, and an accelerometer.

In some implementations, the computing system of the navigation system is further configured to store a digital elevation model representing at least a portion of a navigation environment in a storage of the navigation system, determine that the environmental data correspond to at least a portion of the digital elevation model, determine one or more of an elevation of the unmanned aerial vehicle and a location of the unmanned aerial vehicle relative to a reference point in the digital elevation model, and map the position of the unmanned aerial vehicle in the unmanned aerial vehicle highway based on i) the one or more of the elevation of the unmanned aerial vehicle and the location of the unmanned aerial vehicle relative to the reference point and ii) a position of the reference point in the unmanned aerial vehicle highway.

In some implementations, the unmanned aerial vehicle highway comprises a map of predefined paths. The map of predefined paths corresponds to a network of power transmission lines and transmission towers, and the specified data signature comprises data indicative of one of a transmission tower and a power transmission line. In some implementations, the map of predefined paths corresponds to a road network, and the specified data signature comprises data indicative of at least a portion of a road of the road network. In some implementations, the map of predefined paths corresponds to a pipeline network, and the specified data signature comprises data indicative of at least a portion of a pipeline of the pipeline network.

In some implementations, a plurality of spectra are gathered in which a respective data signature is associated with each spectrum. The computing system of the navigation system is configured to generate a map that i) designates a first position in the map of a first data signature as being associated with a first spectrum of the spectra and ii) designates a second position of a second data signature as being associated with a second spectrum of the spectra. The computing system of the navigation system and determines the position of the unmanned aerial vehicle in the unmanned aerial vehicle highway based on the generated map designating the first position and the second position.

In some implementations, the specified data signature is programmed into a synapse of a neural network, and comparing the environmental data to the specified data signature comprises inputting the environmental data into the neural network.

In some implementations, the specified data signature is indicative of a landmark for a localization and mapping navigation algorithm. In some implementations, the computing system of the navigation system is configured to generate a factor graph, and the landmark is represented by a node in the factor graph.

In some implementations, the computing system of the navigation system implements a neural network that is trained using a plurality of data signatures from a feature database. The computing system of the navigation system is configured to update the feature database with the gathered environmental data.

In some implementations, the computing system of the navigation system is configured to execute a simulation concurrently with gathering the environmental data to predict values of subsequently gathered environmental data and compare the predicted values of the subsequently gathered environmental data to measured values of subsequently gathered environmental data. The computing system updates the simulation based on a difference between the predicted values and the measured values.

In some implementations, the one or more spectra comprise a magnetic field, and the specified data signature comprises a change in a magnitude of the magnetic field.

In some implementations, the computing system of the navigation system is configured to receive data indicative of a congested portion of the unmanned aerial vehicle highway and plan a path of the unmanned aerial vehicle in the unmanned aerial vehicle highway based on the received data to at least partially avoid the congested portion.

In some implementations, the specified data signature is indicative of a beacon of the unmanned aerial vehicle highway.

In some implementations, the UAV includes a battery configured to be charged by the electrical energy generated by the generator motor. The battery provides electrical power to the navigation system to power the navigation system.

In some implementations, the navigation system comprises a global positioning system (GPS) receiver, and where the specified data signature includes GPS coordinates.

In some implementations, the specified data signature includes a tower identifier for a cellular network.

The unmanned aerial vehicle performs operations including gathering, by one or sensors of a navigation system, environmental data in one or more spectra; comparing, by a computing system of the navigation system, the environmental data to a specified data signature in the one or more spectra, the specified data signature being associated with an unmanned aerial vehicle highway; determining, by the computing system of the navigation system and based on comparing the environmental data to the specified data signature, a position of the unmanned aerial vehicle in the unmanned aerial vehicle highway; and providing power to the navigation system by a hybrid generator system configured to: generate mechanical energy by an engine of the hybrid generator system; and generate electrical energy, by a generator motor coupled to the engine, from the mechanical energy generated by the engine, the electrical energy configured to power the navigation system.

In some implementations, the operations of the unmanned aerial vehicle include storing, in a storage of the navigations system, at least a portion of a digital elevation model representing at least a portion of a navigation environment. The computing system of the UAV determines that the environmental data correspond to the portion of the digital elevation model and determines one or more of an elevation of the unmanned aerial vehicle and a location of the unmanned aerial vehicle relative to a reference point in the digital elevation model, the reference point of the digital elevation model being a specified position in the unmanned aerial vehicle highway. The computing system of the UAV and maps the position of the unmanned aerial vehicle in the unmanned aerial vehicle highway based on i) the one or more of the elevation of the unmanned aerial vehicle and the location of the unmanned aerial vehicle relative to the reference point and ii) the specified position of the reference point in the unmanned aerial vehicle highway.

In some implementations, where the operations of the UAV further comprise generating, by the computing system, a map that: designates a first position in the map of a first data signature as being associated with a first spectrum of the spectra; and designates a second position of a second data signature as being associated with a second spectrum of the spectra. The computing system of the UAV determines the position of the unmanned aerial vehicle in the unmanned aerial vehicle highway based on the generated map designating the first position and the second position.

In some implementations, the specified data signature is programmed into a synapse of a neural network, and comparing the environmental data to the specified data signature comprises inputting the environmental data into the neural network.

In some implementations, the computing system of the navigation system implements a neural network that is trained using a plurality of data signatures from a feature database, and the navigation system is configured to update the feature database with the gathered environmental data.

In some implementations, the operations of the UAV include executing, by the computing system, a simulation concurrently with gathering the environmental data to predict values of subsequently gathered environmental data, comparing, by the computing system, the predicted values of the subsequently gathered environmental data to measured values of subsequently gathered environmental data; and updating, by the computing system, the simulation based on a difference between the predicted values and the measured values.

In some implementations, the operations of the UAV include receiving data indicative of a congested portion of the unmanned aerial vehicle highway; and planning a path of the unmanned aerial vehicle in the unmanned aerial vehicle highway based on the received data to at least partially avoid the congested portion.

In some implementations, one or more non-transitory computer readable media of an unmanned aerial vehicle are configured for receiving, from one or sensors of a navigation system, environmental data in one or more spectra; comparing the environmental data to a specified data signature in the one or more spectra, the specified data signature being associated with an unmanned aerial vehicle highway; and determining, based on comparing the environmental data to the specified data signature, a position of the unmanned aerial vehicle in the unmanned aerial vehicle highway.

DESCRIPTION OF DRAWINGS

FIG. 14A shows a diagram of a micro hybrid generator system with detachable subsystems integrated as part of a UAV.

FIG. 14B shows a diagram of a micro hybrid generator system with detachable subsystems integrated as part of a ground robot.

FIG. 16 shows a control system of a micro hybrid generator system.

DETAILED DESCRIPTION

Described herein is a navigation system for an unmanned aerial vehicle (UAV). The navigation system enables the UAV to autonomously navigate from a first location to a second location, such as over long distances of several miles, dozens of miles, or hundreds of miles. The navigation system performs path planning calculations to determine a route for the UAV to take in order to navigate to a desired destination. The path planning calculations use data from pre-loaded maps and data acquired from sensors mounted on the UAV during flight in order to autonomously navigate the UAV.

The navigation system of the UAV navigates the UAV inside of pathways designated for operation of autonomous navigation of aerial vehicles. Such pathways can be known as "UAV highways" and are considered the acceptable zones of operation for UAVs for navigating between two locations. UAV highways provide a clear airspace in which UAVs can operate. The UAV highways facilitate predicable, safe autonomous navigation of the UAVs that does not interfere with other air traffic or infrastructure and that includes traffic management for UAVs. The UAV is configured to navigate using the UAV highways such that the UAV does not enter forbidden airspace. The UAV is configured to navigate to a desired location by taking an efficient route, such as a route that is free of traffic congestion, the shortest route to the destination, etc. The navigation system can autonomously navigate the UAV along pathways designated to be within the UAV highway. In some implementations, the navigation system plans routes along a pre-existing topological infrastructure. For example, the navigation system of the UAV can be configured to plan routes along electrical power grid infrastructure, such as along high voltage transmission lines and near towers that are between power stations of the electrical power grid. For example, the navigation system of the UAV can be configured to plan routes along telecommunication infrastructure, such as along data and power lines supported by utility poles. The navigation system leverages existing terrestrial infrastructure utilizing known topological layouts. The navigation system uniquely identifies elements of the topological layouts for navigation. Elements that are identified can include but are not limited to physical elements of the infrastructure, such as a number of power lines and their spacing/configuration, height of towers, shape of towers, etc., and multi-spectral signatures, such as visual, IR, Thermal, Magnetic, thermal, and other such multi-spectral signatures as described in greater detail below.

Figure 1:
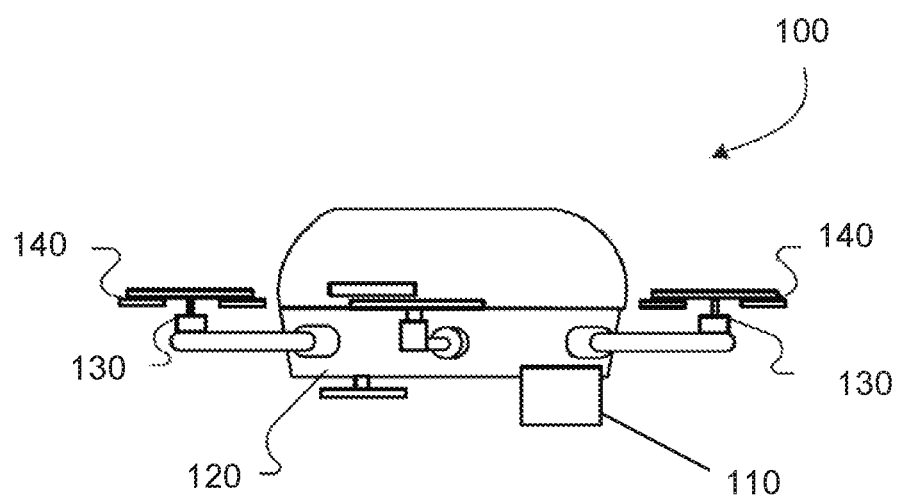
FIG. 1 shows an example unmanned aerial vehicle with a navigation system.

FIG. 1 shows an example UAV 100 configured to navigate a UAV highway (e.g., paths designated by electrical power grid infrastructure). The UAV 100 includes a frame 120 to which multiple rotors 130 are coupled. Each rotor 130 is coupled to a propeller 140. In some implementations, the rotors 130 and propellers 140 are part of a micro hybrid generator system, as described in greater detail below with respect to FIGS. 5-9.

The UAV 100 includes a navigation system 110 which is configured to autonomously navigate the UAV along designated UAV highways. The navigation system 110 includes a sensor package for collecting data about the local environment. The collected data are used for path selection and navigation. One or more types of sensing techniques may be employed by the navigation system; for example, passive and/or active techniques may be used. For example, passive optical, thermal, etc., sensor technology may be used. Similarly, radar, LiDAR, etc. systems that transmit incident signals and collect reflected signals may be employed by the navigation system. The navigation system 110 includes one or more logic engines configured to process both environmental data received from the sensor package of the UAV 100 and data stored in a storage of the UAV.

The navigation system of the UAV 100 is configured to gather data about an environment of the UAV 100. The data gathered can be used for the navigation system 110 to determine the location of the UAV in the environment and for the navigation system 110 to plan a path for the UAV through the environment. For example, the navigation system 110 can be configured to recognize a navigation landmark for localization, as described in further detail below. The navigation system 110 can be specialized for the environment being navigated, such as to interact with a particular infrastructure or feature of the environment during navigation, as described in further detail below. In some implementations, the navigation system 110 includes many discrete sensors in the sensor package. For example, the sensor package of the navigation system 110 can include a global positioning system (GPS) receiver, an infrared (IR) sensor, a magnetic field sensor, a thermal sensor, radar, and electro-optical sensor, an auditory sensor, an accelerometer, a compass, a ranging sensor, a camera, or other such sensors for gathering environmental data.

While the navigation system 110 is depicted as being positioned outside of the UAV 100, in some implementations, the navigation system may be positioned inside a housing of the UAV 100. In some implementations, one or more of the sensors included in the navigation system 110 may be positioned inside of the housing of the UAV 100 and one or more of the sensors may be positioned outside of the housing of the UAV 100, e.g., depending on the design and/or function of the sensor.

The navigation system 110 is configured to autonomously navigate the UAV 100 through an environment using features of the environment. The sensors of the navigation system 110 can be configured to navigate the UAV 100 along routes designated by a preexisting infrastructure that defines the UAV highway.

Figure 2:
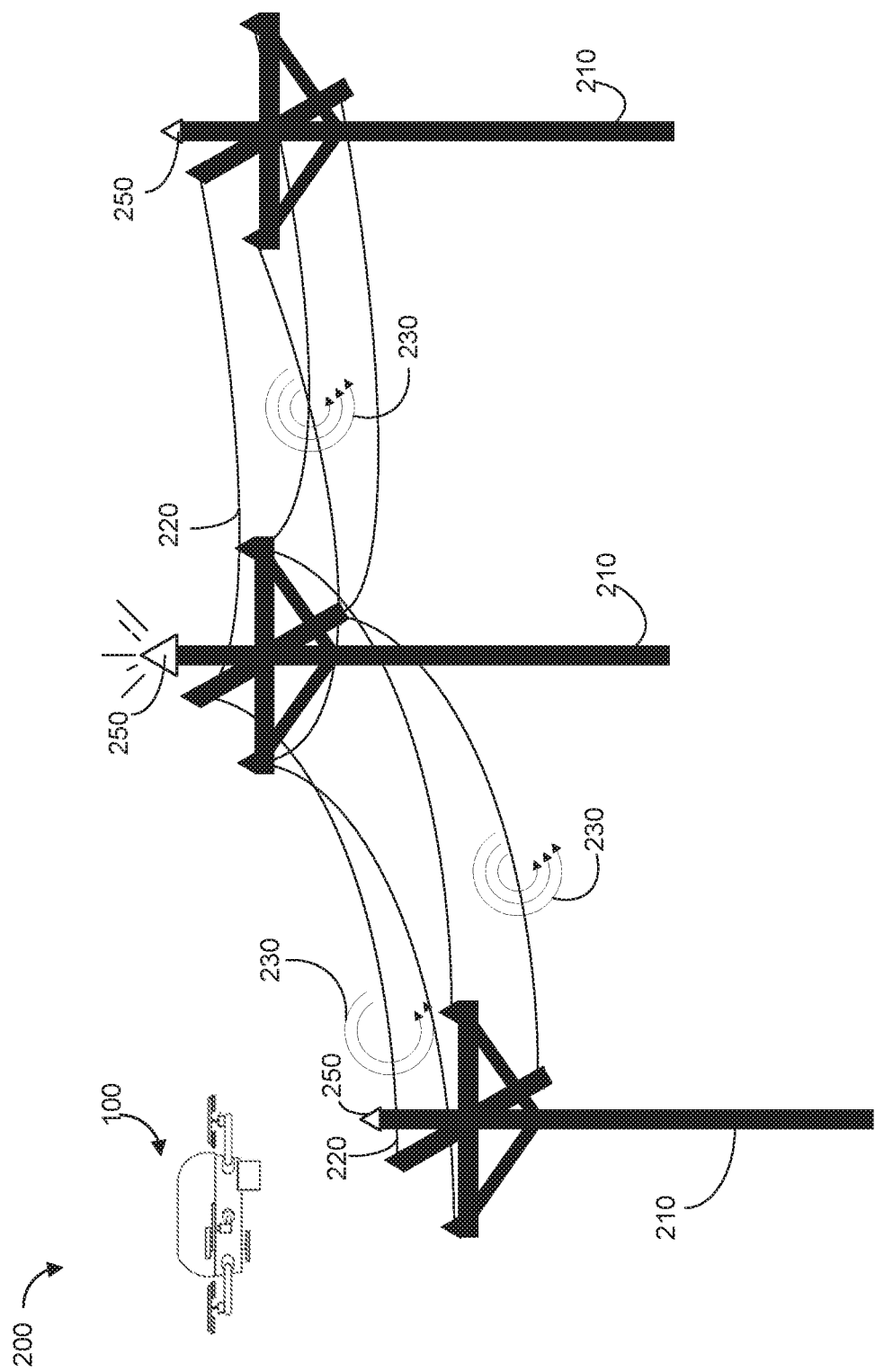
FIG. 2 shows an example environment of an unmanned aerial vehicle highway.

Turning to FIG. 2, a representative environment 200 is shown that includes power transmission and distribution infrastructure and/or telecommunications transmission infrastructure. Utility poles 210 that support transmission lines 220 define the permissible airspace of a UAV highway. The utility poles 210 and transmission lines 220 together form a network that includes features that are detectable by the navigation system 110 of the UAV 100 and that are used during autonomous navigation. While environment 200 shows transmission line infrastructure, other infrastructure networks, in which UAVs can localize themselves relative to the network, can establish a UAV highway. For example, a UAV highway could be established using a road network, pipeline network, canal or waterway network, train tracks, etc. In some implementations, cell tower networks can be used, such as using transmitted tower identification data, signal strength, etc.

The navigation system 110 of the UAV 100 can determine a route along the transmission infrastructure that brings the UAV closer to the desired destination. In some implementations, a route can be planned according to data from a preloaded map of the transmission infrastructure. For example, the navigation system 110 can localize the UAV 100 to a position in the network of transmission infrastructure and plan a path through the transmission infrastructure to the desired destination. In some implementations, the navigation system 110 does not have a preloaded map for path planning, but instead navigates towards a destination (e.g., designated by a known GPS coordinate) by anticipating a route as the UAV 100 navigates along the transmission infrastructure. Navigation techniques (e.g., algorithms) are described in further detail in relation to FIGS. 3-4, below.

The navigation system 110 of the UAV 100 senses a portion of the transmission infrastructure and navigates the UAV along the transmission infrastructure. The following examples can be used either individually or in any combination during navigation for sensing and navigating the UAV 100 to the desired destination.

In some implementations, the navigation system 110 includes a camera and localizes the UAV 100 using visual features of the environment 200. The utility poles 210 can be recognized by the navigation system 110 and the navigation system can ensure that the UAV does not stray too far from the transmission lines by observing the locations of nearby utility poles. In some implementations, the navigation system 110 is configured to visually recognize towers used in high power transmission lines, which can have a distinct visual signature relative to other features of an environment. For example, a tower may include a number identifying the particular tower (e.g., an attached label presenting the numerical identifier). The navigation system 110 can recognize the number and determine the location of the UAV 100 in a stored map.

The navigation system 110 can recognize lines (e.g., power lines) that span between the poles 210. For example, image processing algorithms can be used detect a visual signature produced by one or more lines 220. The navigation system 110 determines that the one or more lines are a part of the infrastructure and should be followed. For example, the navigation system 110 may employ processing techniques (e.g., a Hough transform, Gaussian filtering, Canny edge detection, other edge detection algorithms, etc.) to extract the lines 220 from images captured by an image capture device (e.g., a camera). In some implementations, to conserve processing resources and reduce reaction times of the UAV 100, the navigation system 110 uses a threshold to approximate whether the feature is a power line, rather than mapping the power line to a particular location on a local map generated by the navigation system. In some implementations, the navigation system 110 plots the feature to a local map to be used for subsequent localization determinations and path hysteresis. In some implementations, the navigation system 110 can localize the UAV 100 based on a size or number of detected lines 220.

In some implementations, the navigation system 110 uses digital elevation models (DEMs) to determine an elevation and location of the UAV 100 relative to the features of the environment 200. The navigation system 110 can use both images collected by the camera and ranging data collected by a ranging sensor (e.g., radar, LiDAR, etc. sensor) to determine the altitude, velocity, and location of the UAV 100 relative to the environment 200. For example, the camera may be a stereoscopic camera, and ranging information can be derived from image pairs. In some implementations, range might be estimated by using inertial sensor data in combination with image-tracked features while flying. A feature of the environment 200 is used as a point of reference for DEM image matching computations.

In some implementations, the navigation system 110 combines DEMs data with data representing known heights of transmission towers and power line spacing on the towers. The navigation system 110 disambiguates superfluous lines detected by the sensors such as roadways, guard-rails, or other structures not associated with the power-line infrastructure. In this way, the navigation system 110 can filter the data collected by the sensors of the navigation system 110 of outlier data, false positives, etc. For example, lines that are detected by the navigation system that do not match elevations specified (e.g., predicted) by the DEMs are removed from consideration as being a part of the UAV highway. The navigation system 110 uses DEMs with data representing transmission line features to provide estimations of the altitude of the UAV above the ground. The altitude estimations can be compared to the LiDAR measurements and other collected data for localization redundancy.

In some implementations, the navigation system 110 includes a magnetic sensor configured to measure magnetic fields generated by power transmission along lines 220. For example, the magnetic sensor detects a direction of the magnetic field proximate the lines 220. Since the magnetic field generated by power transmission is proportional to the amount of current flowing through the line 220, the navigation system 110 can determine a distance from the magnetic sensor to the lines 220 based on the detected magnetic signal strength. The navigation system 110 detects both a magnitude and direction of a local magnetic field. The navigation system 110 can determine the orientation of the UAV 100 relative to the lines 220 using the measured direction of the magnetic field. The navigation system 110 can store magnetic field measurements and detect changes in the detected magnetic field over time. The magnetic sensor can detect magnetic fields of magnitudes that are less than 100 µT, such as those produced by 400 kV power lines. In some implementations, the magnetic sensor detects magnetic fields as small in magnitude as 1 µT.

The navigation system 110 uses the measured magnetic fields to determine a location of the UAV 100 and a direction of travel of the UAV 100 relative to the transmission lines. For example, the navigation system 110 is configured to determine whether the UAV 100 is straying from the transmission network if a magnetic field falls below a certain threshold. The navigation system 110 can instruct a controller of the UAV 100 to navigate closer to the transmission lines 220. The navigation system 110 detects a heading or a location of the UAV 100 if the magnetic field changes, such as if the UAV 100 approaches higher-voltage power lines or a power substation. For example, if the navigation system 110 detects a sudden spike in a detected magnetic field, the navigation system 110 can determine that the UAV 100 is at or near a position on the transmission infrastructure that includes a step up to higher voltage power transmission. The navigation system 110 can thus narrow a list of possible locations in which the UAV 100 is located, such as in reference to a stored map of the transmission infrastructure. Such localization can assist in path planning, which is described in further detail below.

In some implementations, the navigation system 110 includes an infrared sensor (IR sensor) to measure infrared radiation, such as from transmission lines 220, transformers (not shown), or other such features of the environment. The navigation system 110 analyzes a strength of the received IR signal to determine a distance from the transmission lines 220. The navigation system 110 can detect changes in the received IR signal, and localize the UAV 100. For example, when the received IR signal rises over a short period of time (e.g., less than a minute), the navigation system 110 can determine that a higher-power location (substation, etc.) is nearby. The IR signal provides a data signature to the navigation system 110 that can be used in combination with other data (such as visual data, LiDAR measurements, etc.) to localize the UAV. The data signature of the IR signal can look similar to other data signatures and be compared to other data for feature extraction. For example, the IR signal can be used to assist in extracting the lines 220 measurements from image data, ranging data, etc.

The navigation system 110 can use a thermal sensor to detect heat emissions of lines 220 and of other features of the environment 200. Since lines 220 have a relatively unique thermal signature, such as relative to other features of the environment, the lines 220 can be distinguished or confirmed by the navigation system 110 using the thermal emission data. In some implementations, the thermal sensor can provide an image depicting thermal emissions of features near the UAV 100. The shape, size, etc. of the thermal emissions of the features can be processed to determine what the features are. For example, long, thin thermal emissions indicate power lines. Thermal data can be used at night or redundant with data collected from other sources.

In some implementations, a beacon 250 on a utility pole 210 can be used to assist in navigation. The beacon can be a visual beacon, an infrared beacon, an electromagnetic beacon, a data transceiver, etc. that transmits a signal that is recognizable to the navigation system 110 of the UAV 100. Beacons 250 can be used to identify routes on the UAV highway. In some implementations, the beacons 250 are uniform or mostly uniform. In some implementations, one or more beacons 250 can be located in the environment at particular locations that are used for navigation, localization, and path planning by the navigation system 110. For example, a utility pole 210 may have a particular beacon at a junction between two different routes. The beacon may indicate to the navigation system 110 that the UAV 100 is at the junction, such as by being a specific color, transmitting a data signal on a predetermined channel, flashing at a particular frequency, or such other distinguishing behaviors. In some implementations, the beacon 250 is used for traffic control, such as to indicate that a route is congested, blocked, etc. A location of the beacon 250 can be indicated on a preloaded map of the navigation system 110. While the beacon 250 is shown on a utility pole 250 in environment 200, a beacon can be placed on other portions of an infrastructure being used for the UAV highway. In some implementations, the beacon 250 is a part of the infrastructure, such as a street light, train signal, etc.

In some implementations, the navigation system 110 uses a GPS device for localization and navigation. The navigation system 110 can correlate GPS data gathered to a preloaded map to determine the position of the UAV 100 on the map. The navigation system 110 uses GPS data to determine the heading required for travel to reach the desired destination, and can plan a route along the transmission infrastructure of the environment 200 based on the determined required heading.

The navigation system 110 gathers data from multiple sources (e.g., GPS, thermal, electromagnetic, infrared, visual, etc.) as described above for redundancy and to increase the accuracy of localization. For example, if GPS data is not received or does not have the resolution required for navigation, other data can be used for localization and navigation. In some implementations, a voting system can be used to determine if a landmark is being identified by the navigation system 110 of the UAV 100. For example, the navigation system 110 can use a thermal signature, a visual signature, and electromagnetic signature of a feature in the environment 200 to determine what the feature is. For example, if the navigation system 110 detects a magnetic field above a threshold and thermal imaging shows lines nearby, the navigation system 110 may conclude that the UAV 100 is near power lines 220, even if the camera cannot visually confirm the presence of the lines or if the GPS device is not working.

The navigation system 110 of the UAV can use map metadata provided by one or more other sources (e.g., map databases) for navigation. For example, the UAV can download a map that includes metadata representing names of roads, buildings, etc. that are present in the map. In some implementations, the metadata specifies which routes in a map are preferable for drone navigation. For example, one or more particular paths through a region may be identified as "low-risk" paths, meaning that these paths include less risk to people or property should the UAV 100 fail. For example, one or more particular paths through a region can be designated as preferable for drone traffic for visual, privacy, noise, etc. reasons. If a particular region is designated a no-fly zone, the UAV can use the metadata indicating this to avoid the region. In some implementations, the metadata indicates a cost function for navigating over regions of a map. The UAV, during navigation, uses the metadata to navigate using a lowest cost path as possible. For example, drone traffic may be prohibited over park grounds, and metadata associated with the map can indicate the borders of the park grounds to assist the UAV 100 in avoiding a flight path over the park. For example, metadata may indicate that a schoolyard should be avoided. Other such examples are possible.

Figure 3:
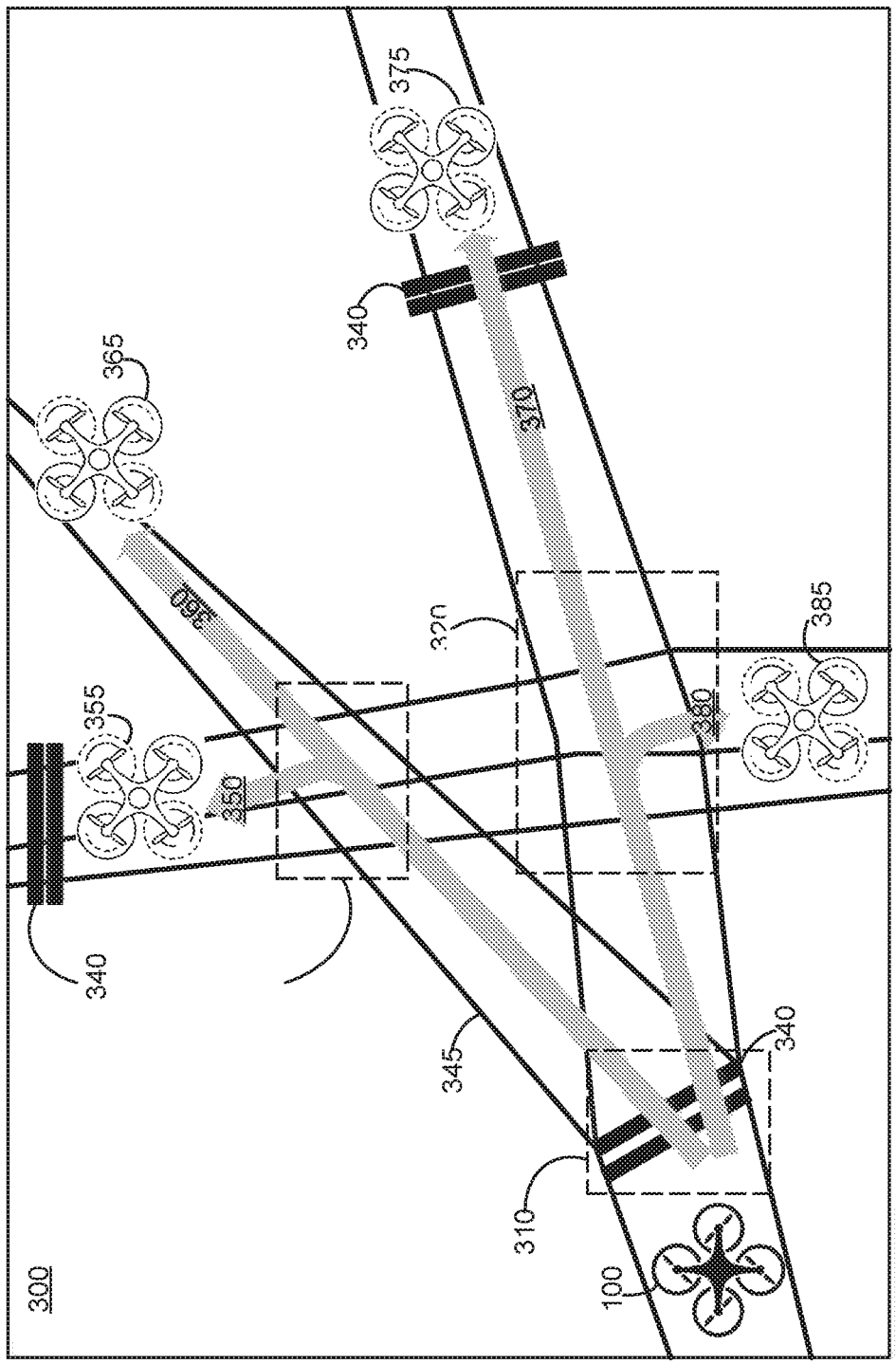
FIG. 3 shows an example environment of an unmanned aerial vehicle navigating highway paths.

FIG. 3 shows an environment 300 including a portion of an unmanned aerial vehicle highway. A UAV 100 is shown navigating a portion of the UAV highway. The environment 300 includes junctions 310, 320, and 330 in the unmanned aerial vehicle highway. In the implementation of FIG. 3, the unmanned aerial vehicle highway is designated by a transmission line infrastructure, but use of other infrastructure, such as railroad lines, roads, pipelines, etc. are possible.

The UAV 100 (e.g., a computing system of the UAV) plans a path and navigates to a target destination in several stages. The UAV 100 gathers data about the environment 300, such as using a navigation system (e.g., navigation system 110 described above in relation to FIGS. 1-2). After environmental data has been acquired by the UAV 100, the UAV performs a localization calculation to determine the current position of the UAV in the environment 300. The UAV 100 plots a path from the determined current position of the UAV to the target destination, taking into account constraints of the UAV highway. Once a path has been plotted by the UAV 100, the UAV determines a target heading for a current control iteration of the UAV that moves the UAV along the planned path and that also avoids obstacles, such as other UAVs. A motor control signal from the computing system of the UAV 100 controls the rotors of the UAV to move the UAV in the direction of the target heading.

The UAV 100 performs the localization calculation using data gathered about the environment 300. The UAV 100 gathers data as described above in relation to FIG. 2. The data gathered by the UAV enables the UAV to determine where in the UAV highway the UAV is positioned. The UAV can compare data gathered to known data signatures (e.g., "signals of opportunity") to narrow a list of possible locations from anywhere on a UAV highway to several locations. Data signatures gathered from different sensors of the navigation system 110 can be used to build a profile of the location of the UAV 100 and map the location to a corresponding, known location of a pre-loaded map or to a GPS location with known features that correspond to the detected data signatures.

Gathering data about a location using redundant sensing systems can facilitate localization and improve navigation of the UAV 100 in the UAV highway. The UAV 100 can build a local map of its surroundings and compare the local map to a preloaded global map. For example, the multi-spectral data that is gathered by the UAV can be used to build a codified map that designates positions of data signatures for multiple spectra in relation to one another. A deep learning neural network framework can be used to generate the local map. For example, data signatures can be programmed into synapses of a neural network layer, e.g., by a particular weighting configuration of the layer. When data is detected, the data can be sent through the neural network layer, and the data signature can be quickly recognized and added to the local map of the UAV 100. Generating the local map increases navigational accuracy, such as over intrinsic GPS inaccuracies. The local map can be used for navigation, such as if GPS service is disrupted.

For example, UAV 100 traverses junction 310 during navigation of the UAV highway. At junction 310, UAV 100 gathers data about junction 310 to identify the junction as being junction 310. The UAV 100 can record the UAV heading at the junction 310. The UAV 100 can determine a number of detected power lines, such as power line 345, near junction 310 (two in this case). The UAV 100 can determine a type of tower 340 or detect a tower number associated with the tower, and so forth. If the UAV 100 has gathered enough data, the UAV can determine that it is near junction 310 (e.g., using deep learning, as described above).

In some implementations, the UAV 100 did not gather enough data to localize and needs to continue to navigate to determine its position. For example, after traversing junction 310, the UAV 100 is not able to localize. The UAV 100 continues to navigate along the UAV highway without planning a path, such as by attempting to navigate toward the target destination (e.g., using heading data) along a permissible path of the UAV highway, using reactive autonomous navigation. Once UAV 100 reaches junction 330, the UAV 100 gathers additional data. For example, as shown in FIG. 3, junction 330 includes another path that has three power lines. Once the UAV 100 detects the junction 330, the UAV 100 is able to determine that it is at junction 330. For example, the UAV 100 can use a path history and data gathered at junction 310 to match the path taken by the UAV to a portion of the preloaded map.

The UAV 100 localizes using several methods. For example, a Monte Carlo localization technique can be used in combination with the neural network deep learning approach described above. For example, the UAV 100 may gather data about its position within a probability. The UAV compares the environmental data to a preloaded map and plots all positions in which the UAV can be above a threshold probability. This process repeats in an interactive fashion until the UAV converges on a location with a high probability.

The UAV 100 can use one or more particle filters to assist in localization calculations. Multi-spectral measurements by the navigation system 110 are compared to known signatures (e.g., features) at a number of sampled locations in the environment 300, such as junctions 310, 320, 330, etc. Each location of the sampled locations is weighted based on how closely the detected signature of the UAVs 100 current location matches the known signatures of the sampled locations. Resampling iterations are conducted until a location is estimated with a threshold probability. In some implementations, a known speed, heading, or other data can be used by the navigation system 110 to update the estimated location and anticipate the next location of the UAV 100 during flight, further increasing accuracy of the particle filter as new data signatures are measured.

The UAV 100 can use a Simultaneous Localization and Mapping (SLAM) algorithm to determine the current and projected locations of the UAV. Landmarks of the SLAM algorithm correspond to features, such as junctions 310-330, lines 345, towers 340, etc. of the drone highway in environment 300. The SLAM algorithm can interpret different features from the multi-spectral imaging performed. In some implementations, the navigation system 110 can represent SLAM parameters in a factor graph. To reduce computing complexity that occurs for three dimensional mapping computations and increase scalability for data processing, the navigation system 110 can simplify the factor graph. For example, generic linear constraints (GLCs) can be imposed on a SLAM graph to remove nodes from the graph and control the computational cost of graph optimization.

In some implementations, the UAV 100 uses one or more of the following SLAM approaches. A landmark based SLAM approach can be used in which the navigation system 110 is pre-loaded with a database (e.g., library) of landmark features. The UAV 100 is configured to recognize landmarks from the database in the environment 300 when navigating. In some implementations, feature maps of vast areas are stored onboard the UAV 100. For example, one or more solid-state drive (SSD) cards can be integrated into the onboard mission computer. As such, the UAV 100 performs loop closure rather than building and growing the map (as is the case for full SLAM approaches).

Feature matching (loop closure) from an external database can be difficult, such as when the database is built using data collected from limited view-points, different lighting conditions, seasons, sensor parameters etc. In some implementations, to overcome these challenges, deep learning (e.g., deep neural networks, or DNNs) approaches described above are used. The DNN can be trained before the UAV commences navigation by using the feature database with offline simulated virtual flights, with varying sensor parameters, environmental conditions, and vehicle flight profiles. The DNN of the UAV 100 can learn semantically meaningful higher-order features that will still be distinguishable in the real-world even with all the aforementioned uncertainties. For example, seeing a baseball diamond from altitude is highly distinguishable compared to trying to recognize a grassy green field, which is very common and easily mistaken for every other grassy field.

In some implementations, the navigation system runs a simulation (and DNN training) onboard the UAV 100 in parallel to live flights, thereby tuning the DNN to adjust to discrepancies between simulation and reality. The UAV 100 anticipates how the world should look and behave allowing the UAV to initially reason about its location dynamically, both spatially and temporally. The UAV 100 can subsequently adjust a flight path to gather additional information to confirm any assumptions that were made about the environment 300 and update its DNN. For example, if the UAV 100 determines that it is near a partially occluded landmark, the UAV can perform a simulation to determine how best to gather additional data about the landmark and then adjust its position to gather the additional data regarding the landmark and confirm the identity of the landmark.

In some implementations, rather than using landmarks, the navigation system 110 builds a map from scratch during navigation. The map is built using the environmental data gathered by the one or more sensors of the UAV 100. In some implementations, the UAV uploads the map it built to a cloud computing system (or other such communal storage) for other UAVs to download. In this way, a plurality of UAVs work together to build and update a map of the UAV highway. For example, if a portion of the UAV highway changes or becomes unusable (e.g., if a power line goes down and is no longer detectable by the UAV 100), the UAV can update its local map and send this information to the communal storage to update a global UAV highway map. The update can be used by other UAVs to path plan to avoid the problem area or otherwise path plan. In another example, a road can be destroyed, moved, flooded, etc. and may be unrecognizable by a UAV as part of a road network that designates a path of the UAV highway. The UAV 100 can mark this location (e.g., include a geotag) in the UAV highway with timestamp of when the anomaly was discovered. The geotags and timestamps of the UAV can be sent to the cloud computing system to indicate where and when anomalies have occurred.

The UAV 100 is capable of combining the localization techniques described above with deep learning techniques to further improve localization. For example, the UAV navigation system 110 can train large scale convolutional neural network (CNN) architectures for the localization tasks and employs multi-scale feature encoding methods to generate a rich feature set. The navigation system 110 enables correct classification of location regardless of environmental conditions (lighting, seasons, etc.) and differing viewpoints by using the deep learning approach.

Once the UAV 100 has determined its position, the UAV plans a path. For example, the UAV may determine that the target destination is in the direction of route 360. By recognizing features of the route 360, such as that the route has two power lines, UAV 100 can choose route 360 to navigate to position 365. In another example, the UAV 100 can plan a path along route 350. By recognizing the tower 340 is near junction 330, and that route 350 includes three power lines, UAV 100 navigates to position 355. UAV 100 uses a similar approach to distinguish junction 320 from junction 310 and junction 330, and to navigate along route 380 to position 385 or along route 370 to position 375.

The UAV 100 plans a path based on the amount of data the UAV possesses about the environment 300. In some implementations, the UAV performs A*, D*, Dijkstra's algorithm, or heuristic path planning in cases where a global map is not known or the UAV has not determined its position in the global map. The UAV 100 chooses a path with an expected lowest cost using environment data that has already been gathered. In some implementations, a route between junctions may be known to have high traffic congestion or otherwise be unusable, and the UAV 100 can plan a route that avoids it. In some implementations, a rapidly exploring random tree (RRT) method can be used for path planning, such as in combination with the path planning techniques described above.

The UAV 100 autonomously navigates by accounting for immediate surroundings, which influence path planning. In some implementations, if the UAV 100 detects an obstacle or that the UAV is straying from a designated lane of the UAV highway, the UAV will prioritize reacting to the immediate problem over navigation to the target destination.

For example, the UAV 100 can detect that transmission lines have disappeared from view or that the magnetic field has fallen below a minimum threshold. The UAV 100 can maneuver closer to the transmission lines, such as by seeking greater magnetic field readings or by turning in place until the transmission lines are found.

In some implementations, the navigation algorithms above are used for fine adjustment of the position of the UAV 100 in its local environment. In addition to navigating through the UAV highway, the UAV 100 is configured to navigate autonomously in its local environment. For example, the UAV 100 is configured to avoid obstacles, such as buildings, trees, other UAVs, power lines, etc. while navigating through the UAV highway. The UAV 100 can navigate at different altitudes in the UAV highway. For example, the UAV 100 is not required to fly above power lines, but can fly next to or below the power lines. The navigation system 110 is configured to navigate the UAV through the UAV highway, such as through structures of the transmission towers when the UAV is flying below the power lines. The UAV 100 can fly between trees in the forest, between buildings or streetlights, etc. The UAV 100 is thus configured to path plan through the UAV highway but also autonomously though its local environment.

As described below, the computing capability of the navigation system 110 has few hardware restrictions, such as weight or power restrictions. For example, the computing system of the navigation system 110 has access to enough power to operate the navigation algorithms described herein without significantly compromising flight time (e.g., reducing flight time by more than 10%). In some implementations, the computing hardware is interfaced with the micro hybrid generator system (e.g., micro hybrid generator system 500), and can access up to 1800 W of power.

In some implementations, the UAV 100 coordinates with one or more other UAVs for one or both of path planning and power sharing. The UAV 100 can communicate with one or more other UAVs in a communications network between the UAVs (e.g., a mesh network). For example, each UAV in the network is configured to transmit and receive data from one or more other UAVs in the network.

The UAVs that are communicating with one another can share processing power. The UAV 100 can offload some of processing to a nearby UAV. For example, if the power of UAV 100 is getting low (e.g., fuel is below a predefined threshold, a battery is below a predefined charge, etc.), the UAV 100 can send data to another UAV for processing. The nearby UAV, for example, may have more power than the UAV 100 and may designate itself as eligible to perform additional processing for nearby UAVs. The UAV 100 sends gathered data from one or more spectra to the other UAV (or UAVs). The other UAVs process the data and send localization data, updated map data, etc., back to UAV 100.

In some implementations, the UAV 100 can share gathered environmental data and/or localization data with one or more other UAVs. The UAV can send, either directly (e.g., via transmission to another UAV) or indirectly (e.g., by storing data in a cloud computing system) data to one or more other UAVs. In some implementations, the UAV 100 gathers environmental data and transmits the data to the cloud computing system to enrich a database of environmental data that can be used by other UAVs for navigation. For example, the environmental data can be used to update a library of data signatures that is downloaded by other UAVs for navigation.

Figure 4:
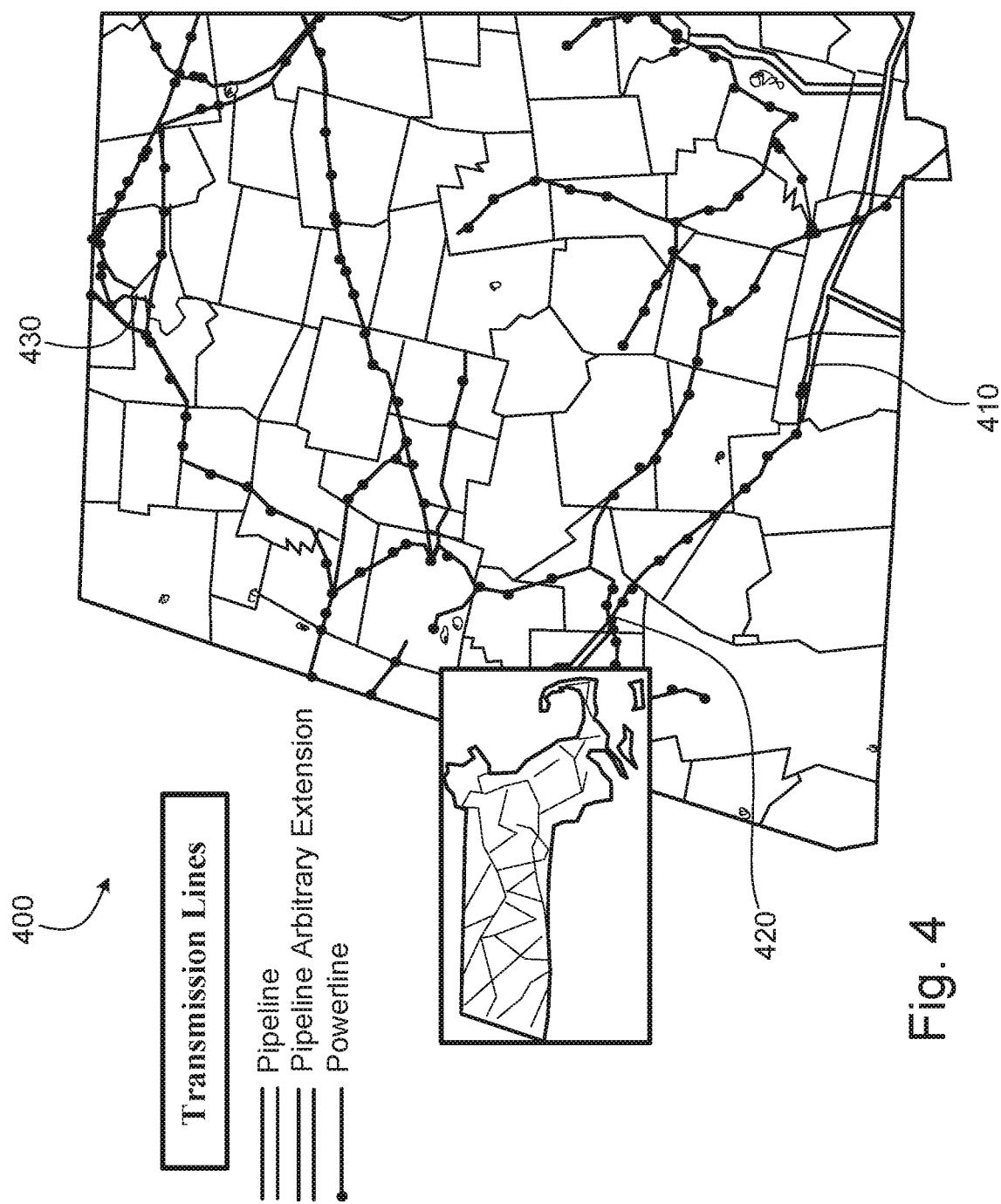
FIG. 4 shows an example of a map.

FIG. 4 shows an example of a map 400. The map 400 can include one or more features that are useful for localization of the UAV. In some implementations, the map is a preloaded map. For example, when UAV 100 is navigating over a power line route and detects a transition to a pipeline route, the UAV may determine that it is at one or more locations (e.g., locations 410 or 420). The UAV 100 may compare known data about the UAV highway, such as the power level of transmission lines at various locations, to data gathered by the UAV. In some arrangement, one or more simulations may be executed by the UAV 100 to estimate measurement levels for comparison to actual measured values. Since simulations can be executed on-board the UAV a latency incurred by using remote or distributed processing is eliminated and reaction times for the UAV are reduced.

In some implementations, the map 400 is used to store information about the infrastructure being navigated. For example, the UAV 100 can perform power line inspections while using the grid routes as flight corridors. Information about the infrastructure can be transmitted to an infrastructure management organization, such as to report a requirement for maintenance, etc.

The map 400 can be loaded from a cloud computing resource or other storage system shared by multiple UAVs. As described above, the map 400 can be updated by different UAVs as they navigate the UAV highway. If a UAV detects a change in the UAV highway (e.g., a flooded street is no longer detectable), the UAV can indicate the change by a geotag and/or a timestamp. The change can be downloaded by other UAVs and used for path planning, localization, etc. For example, the geotags and timestamps can be included in metadata associated with the map 400 that are used by the UAVs for determining which path through the UAV highway is ideal. For example, a path that has an anomaly marked in the map 400 may be assigned a higher cost by navigating UAVs and thus avoided.

In some implementations, the UAV 100 can be powered by a micro hybrid generator system that provides a small portable micro hybrid generator power source with energy conversion efficiency. In UAV applications, the micro hybrid generator system can be used to overcome the weight of the vehicle, the micro hybrid generator drive, and fuel used to provide extended endurance and payload capabilities in UAV applications.

The micro hybrid generator system can include two separate power systems. A first power system included as part of the micro hybrid generator system can be a small and efficient gasoline powered engine coupled to a generator motor. The first power system can serve as a primary source of power of the micro hybrid generator system. A second power system, included as part of the micro hybrid generator system, can be a high energy density rechargeable battery. Together, the first power system and the second power system combine to form a high energy continuous power source and with high peak power availability for a UAV. In some examples, one of the first power system and the second power system can serve as a back-up power source of the micro hybrid generator system if the other power system experiences a failure.

Figure 5:
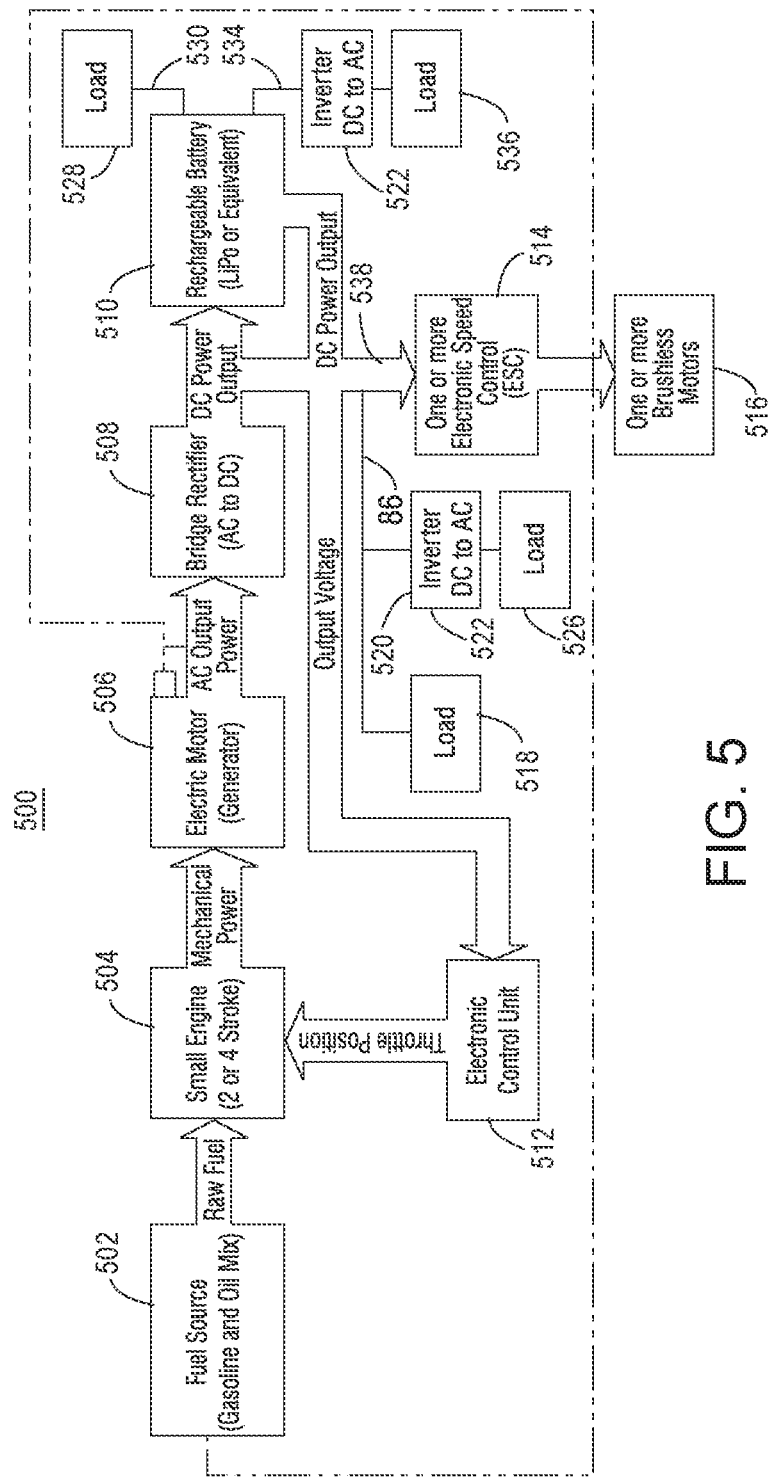
FIG. 5 shows a diagram of an example micro hybrid generator system.

FIG. 5 shows a diagram of an example micro hybrid generator system 500. The micro hybrid generator system 500 includes a fuel source 502 (e.g., a vessel) for storing gasoline, a mixture of gasoline and oil mixture, or similar type fuel or mixture. The fuel source 502 provides fuel to an engine 504 of a first power system. The engine 504 can use the fuel provided by the fuel source 502 to generate mechanical energy. In some examples, the engine 504 can have dimensions of about 12" by 11" by 6" and a weight of about 3.5 lbs. to allow for integration in a UAV. In some examples, the engine 504 may be an HWC/Zenoah G29 RCE 3D Extreme available from Zenoah, 1-9 Minamidai Kawagoe, Saitama 350-2025, Japan. The micro hybrid generator system 500 also includes a generator motor 506 coupled to the engine 504. The generator motor 506 functions to generate AC output power using mechanical power generated by the engine 504. In some examples, a shaft of the engine 504 includes a fan that dissipates heat away from the engine 504. In some examples, the generator motor 506 is coupled to the engine 504 through a polyurethane coupling.

In some examples, the micro hybrid generator system 500 can provide 1.8 kW of power. The micro hybrid generator system 500 can include an engine 504 that provides approximately 3 horsepower and weighs approximately 1.5 kg. In some examples, the engine 504 may be a Zenoah® G29RC Extreme engine. The micro hybrid generator system 500 can include a generator motor 506 that is a brushless motor, such as a 380 Kv, 8 mm shaft, part number 5035-380, available from Scorpion Precision Industry®.

In some examples, the micro hybrid generator system 500 can provide 10 kW of power. The micro hybrid generator system 500 can include an engine 504 that provides approximately between 15-16.5 horsepower and weighs approximately 7 pounds. In some examples, the engine 504 is a Desert Aircraft® D-150. The micro hybrid generator system 500 can include a generator motor 506, such as a Joby Motors® JM1 motor.

The micro hybrid generator system 500 includes a bridge rectifier 508 and a rechargeable battery 510. The bridge rectifier 508 is coupled between the generator motor 506 and the rechargeable battery 510 and converts the AC output of the generator motor 506 to DC power to charge the rechargeable battery 510 or provide DC power to load 518 by line 520 or power to DC-to-AC inverter 522 by line 524 to provide AC power to load 526. The rechargeable battery 510 may provide DC power to load 528 by line 530 or to DC-to-AC inverter 532 by line 534 to provide AC power to load 536. In some examples, an output of the bridge rectifier 508 and/or the rechargeable battery 510 of micro hybrid generator system 500 is provided by line 538 to one or more electronic speed control devices (ESC) 514 integrated in one or more rotor motors 516 as part of a UAV. The ESC 514 can control the DC power provided by bridge rectifier 508 and/or rechargeable battery 510 to one or more rotor motors provided by generator motor 506. In some examples, the ESC 514 can be a T-Motor® ESC 45A (2-6S) with SimonK. In some examples, the bridge rectifier 508 can be a model #MSD100-08, diode bridge 800V 100A SM3, available from Microsemi Power Products Group®. In some examples, active rectification can be applied to improve efficiency of the micro hybrid generator system.

In some examples, the ESC 514 can control an amount of power provided to one or more rotor motors 516 in response to input received from an operator. For example, if an operator provides input to move a UAV to the right, then the ESC 514 can provide less power to rotor motors 516 on the right of the UAV to cause the rotor motors to spin propellers on the right side of the UAV slower than propellers on the left side of the UAV. As power is provided at varying levels to one or more rotor motors 516, a load (e.g., an amount of power provided to the one or more rotor motors 516) can change in response to input received from an operator.

In some examples, the rechargeable battery 510 may be a LiPo battery, providing 3000 mAh, 22.2V 65C, Model PLU65-30006, available from Pulse Ultra Lipo®, China. In some examples, the rechargeable battery 510 may be a lithium sulfur (LiSu) rechargeable battery or similar type of rechargeable battery.

The micro hybrid generator system 500 includes an electronic control unit (ECU) 512. The ECU 512, and other applicable systems described herein, can be implemented as a computer system, a plurality of computer systems, or parts of a computer system or a plurality of computer systems. The computer system may include a processor, memory, non-volatile storage, and an interface. A typical computer system will usually include at least a processor, memory, and a device (e.g., a bus) coupling the memory to the processor. In some examples, the processor may be a general-purpose central processing unit (CPU), such as a microprocessor, or a special-purpose processor, such as a microcontroller.

In some examples, the memory can include random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may be written, by a direct memory access process, into memory during execution of software on the computer system. The non-volatile storage can be local, remote, or distributed. The non-volatile storage may be optional because systems can be created with all applicable data available in memory.

Software is typically stored in the non-volatile storage. In some examples (e.g., for large programs), it may not be practical to store the entire program in the memory. Nevertheless, it should be understood that the software may be moved to a computer-readable location appropriate for processing, and for illustrative purposes, that location is referred to as the memory herein. Even when software is moved to the memory for execution, the processor will typically make use of hardware registers to store values associated with the software, and local cache that, in some examples, serves to speed up execution. As used herein, a software program may be stored at an applicable known or convenient location (e.g., from non-volatile storage to hardware registers) when the software program is referred to as "implemented in a computer-readable storage medium." A processor is considered to be "configured to execute a program" when at least one value associated with the program is stored in a register readable by the processor.

In some examples of operation, a computer system can be controlled by operating system software, such as a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. In some examples, the I/O devices can include a keyboard, a mouse or other pointing device, disk drives, printers, a scanner, and other I/O devices, including a display device. In some examples, the display device can include a cathode ray tube (CRT), liquid crystal display (LCD), or some other applicable known or convenient display device. The interface can include one or more of a modem or network interface. It will be appreciated that a modem or network interface can be considered to be part of the computer system. The interface can include one or more of an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used herein, a module can include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other modules. Depending upon implementation-specific or other considerations, in some examples, a module can be centralized or its functionality distributed. A module can include hardware, firmware, or software embodied in a computer-readable medium for execution by the processor. The processor can transform data into new data using implemented data structures and methods, such as is described with reference to the figures included herein.

The ECU 512 is coupled to the bridge rectifier 508 and the rechargeable battery 510. The ECU 512 can be configured to measure the AC voltage of the output of the generator motor 506, which is directly proportional to the revolutions per minute (RPM) of the engine 504, and compares it to the DC power output of the bridge rectifier 508. The ECU 512 can control the throttle of the engine 504 to cause the DC power output of the bridge rectifier 508 to increase or decrease as the load changes (e.g., a load of one or more electric motors 516 or one or more of loads 518, 526, 528, and 536). In some examples, the ECU 512 can be an Arduino® MEGA 2560 Board R3, of Turin Italy. In various embodiments, a load of one or more electric motors 516 can change as the ESC 514 changes an amount of power provided to the electric motors 516. For example, if a user inputs to increase the power provided to the electric motors 516 subsequently causing the ESC 514 to provide more power to the electric motors 516, then the ECU 512 can increase the throttle of the engine 504 to cause the production of more power to be provided to the electronic motors 516.

The ECU 512 can function to maintain voltage output of loads by reading the sensed analog voltage, converting the sensed analog voltage to ADC counts, comparing the count to that corresponding to a desired voltage, and increasing or decreasing the throttle of the engine 504 according to the programmed gain if the result is outside of the dead band.

In some examples, the micro hybrid generator system 500 can provide about 1,800 watts of continuous power, 10,000 watts of instantaneous power (e.g., 6S with 16,000 mAh pulse battery) and has a 1,500 Wh/kg gasoline conversion rate. In some examples, the micro hybrid generator system 500 has dimensions of about 12" by 12" by 12" and a weight of about 8 lbs.

Figure 6:
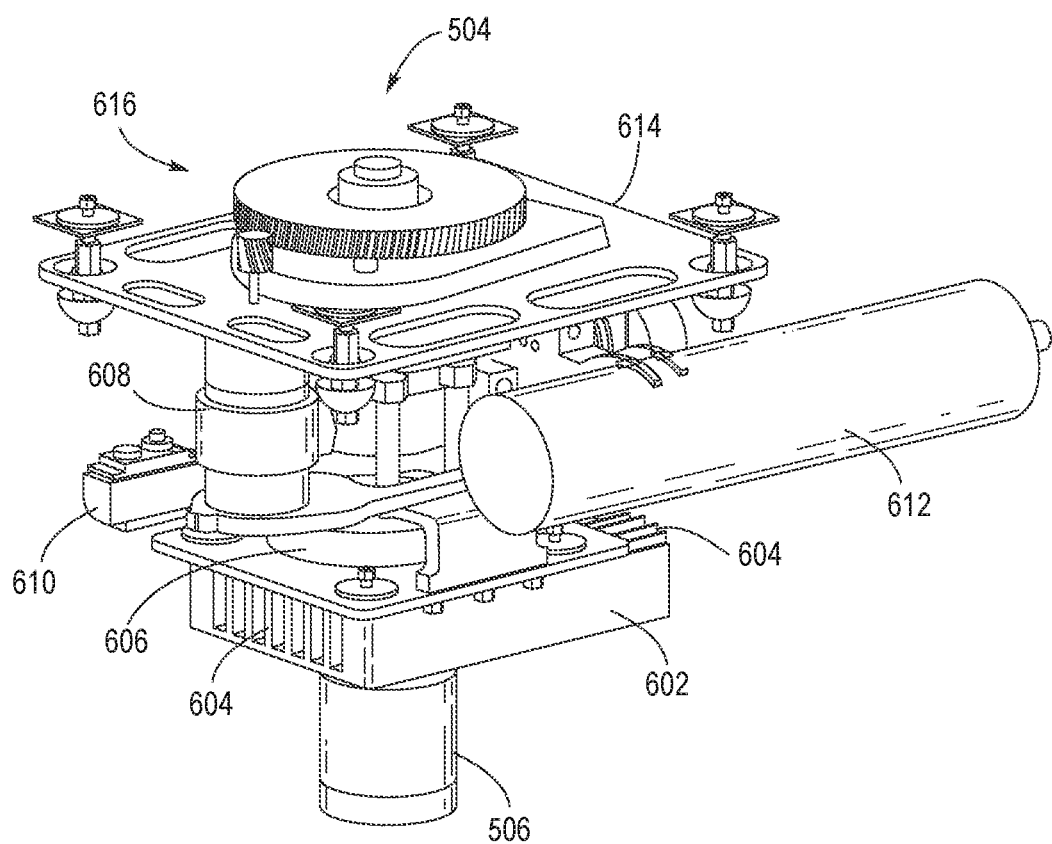
FIG. 6 shows a side perspective view of a micro hybrid generator system.
Figure 7A:
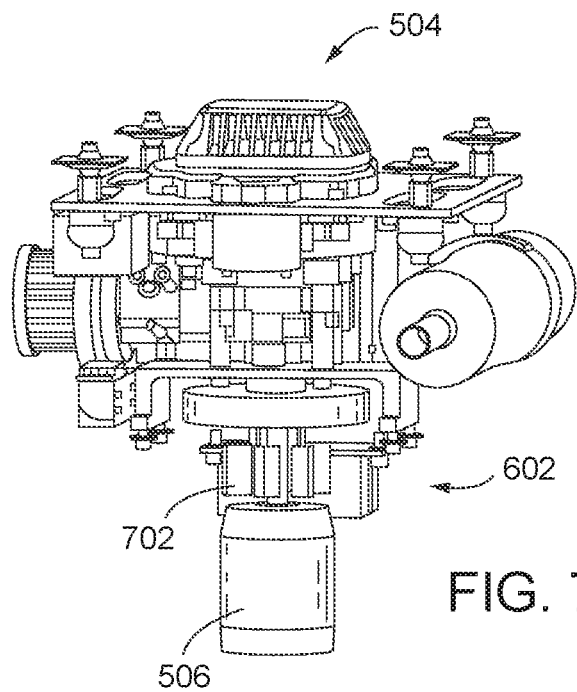
FIG. 7A shows a side view of a micro hybrid generator.
Figure 7B:
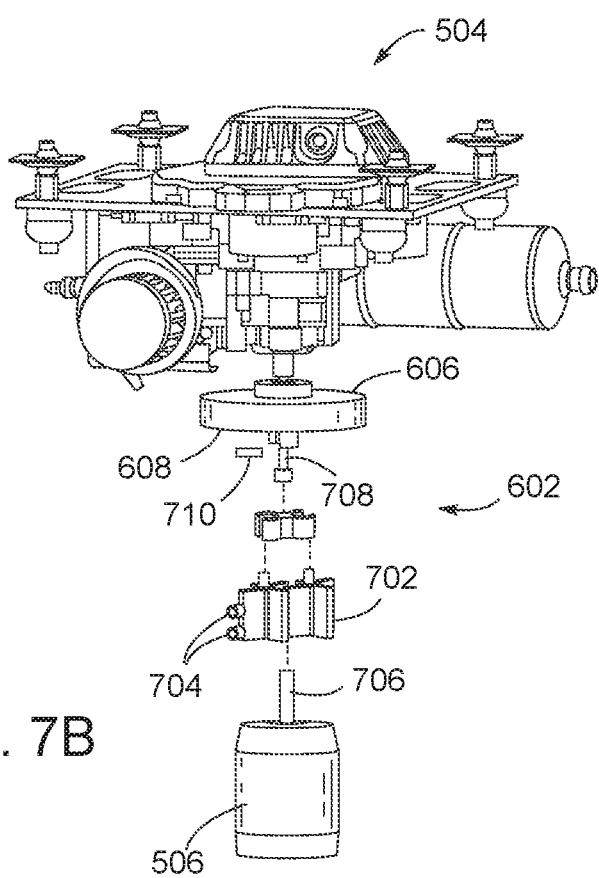
FIG. 7B shows an exploded side view of a micro hybrid generator.

FIG. 6 shows a side perspective view of a micro hybrid generator system 500. FIG. 7A shows a side view of a micro hybrid generator 500. FIG. 7B shows an exploded side view of a micro hybrid generator 500. The micro hybrid generator system 500 includes an engine 504 coupled to generator motor 506. In one embodiment, the engine 504 includes a coupling/cooling device 602 that provides coupling of the shaft of the generator motor 506 to the shaft of the engine 504 and provides cooling with sink fins 604. For example, FIGS. 7A and 7B show in further detail one embodiment of coupling/cooling device 602, which includes coupling/fan 702 with set screws 704 that couple shaft 706 of generator motor 506 and shaft 708 of the engine 504. Coupling/cooling device 602 may also include rubber coupling ring (2202 of FIG. 22A).

In some examples, the micro hybrid generator system 500 includes components to facilitate transfer of heat away from the micro hybrid generator system 500 and/or is integrated within a UAV to increase airflow over components that produce heat. For example, the hybrid generator system 500 can include cooling fins on specific components (e.g. the rectifier) to transfer heat away from the micro hybrid generator system. In some examples, the micro hybrid generator system 500 includes components and is integrated within a UAV to cause heat to be transferred towards the exterior of the UAV. In some implementations, the heat dissipation system of the UAV can be interfaced with the computing hardware, such as of navigation system 110, to remove heat during operation. Since the navigation system 110 can draw up to 1800 W of power, the head dissipation system reduces the risk of damage to the computing hardware.

In some examples, the micro hybrid generator system 500 and/or a UAV integrating the micro hybrid generator system 500 is configured to allow 406 cubic feet per minute of airflow across at least one component of the micro hybrid generator system 500. An engine 504 of the micro hybrid generator system 500 can be run at an operating temperature 150° C. and if an ambient temperature in which the micro hybrid generator system 500, in order to remove heat generated by the engine 506, an airflow of 406 cubic feet per minute is achieved across at least the engine 506. Further, in some examples, the engine 506 is operated at 16.5 Horsepower and generates 49.2 kW of waste heat (e.g. each head of the engine produces 24.6 kW of waste heat). In some examples, engine heads of the engine 506 of the micro hybrid generator system 500 are coupled to electric ducted fans to concentrate airflow over the engine heads. For example, 406 cubic feet per minute airflow can be achieved over engine heads of the engine 506 using electric ducted fans.

In some examples, the micro hybrid generator system 500 is integrated as part of a UAV using a dual vibration damping system. An engine 506 of the micro hybrid generator system can utilize couplings to serve as dual vibration damping systems. In some examples, the engine 506 produces a mean torque of 1.68 Nm at 10,000 RPM. In some examples, a urethane coupling is used to couple at least part of the micro hybrid generator system 500 to a UAV. Further, in some examples, the urethane coupling can have a durometer value of between 90A to 75D. Example urethane couplings used to secure at least part of the micro hybrid generator system 500 to a UAV include L42 Urethane, L100 Urethane, L167 Urethane, and L315 Urethane. Urethane couplings used to secure at least part of the micro hybrid generator system 500 to a UAV can have a tensile strength between 20 MPa and 62.0 MPa, between 270 to 800% elongation at breaking, a modulus between 2.8 MPa and 32 MPa, an abrasion index between 110% and 435%, and a tear strength split between 12.2 kN/m and 192.2 kN/m.

The engine 504 also includes a fly wheel 606 which can reduce mechanical noise and/or engine vibration. In some examples, engine 504 includes a Hall-Effect sensor (710 of FIG. 7A) and a Hall Effect magnet coupled to fly wheel 606, as shown. In some examples, the Hall-effect sensor 710 may be available from RCexl Min Tachometer®, Zhejiang Province, China.

When the engine 504 is operational, fly wheel 606 spins and generates a voltage which is directly proportional to the revolutions per minute of fly wheel 606. This voltage is measured by Hall-effect sensor 710 and is input into an ECU 512. The ECU 512 compares the measured voltage to the voltage output by generator motor 506. ECU 512 will then control the throttle of either or both the generator motor 506 and the engine 504 to increase or decrease the voltage as needed to supply power to one or more of loads 518, 526, 528, and/or 536 or one or more rotor motors 516.

The engine 504 may also include a starter motor 608, servo 610, muffler 612, and vibrational mount 614.

Figure 8:
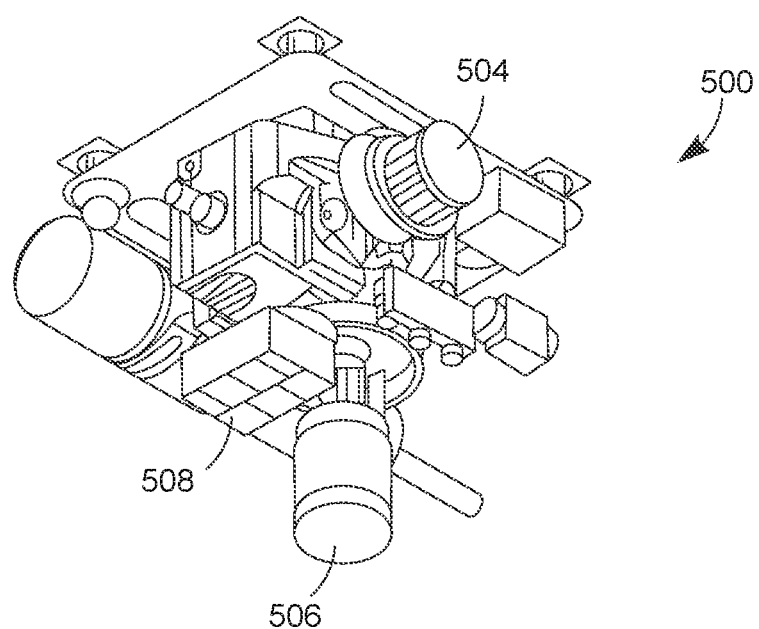
FIG. 8 shows a perspective view of a micro hybrid generator system.

FIG. 8 shows a perspective view of a micro hybrid generator system 500. The micro hybrid generator system 500 includes an engine 504 and generator motor 506 coupled to a bridge rectifier 508. The generator motor 506 includes a shaft oriented parallel to the axis of rotation of the at least one propeller and oriented vertically with respect to the ground when the UAV is airborne.

Figure 9:
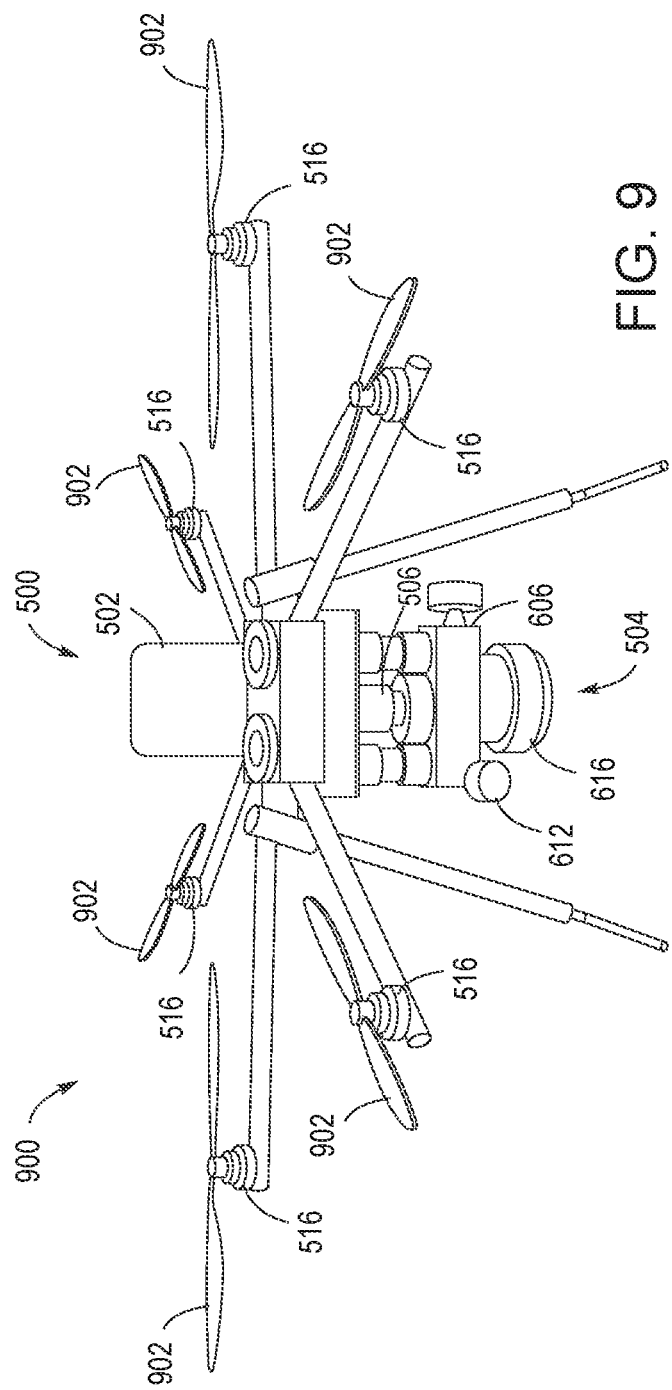
FIG. 9 shows a perspective view of a UAV integrated with a micro hybrid generator system.

FIG. 9 shows a perspective view of a UAV 900 integrated with a micro hybrid generator system 500. The UAV 900 includes six rotor motors 516 each coupled to propellers 902, however it is appreciated that a UAV integrated with a micro hybrid generator system 500 can include more or fewer rotor motors and propellers. The UAV 900 can include a Px4 flight controller manufactured by Pixhawk®.

In some examples, the engine 504 may be started using an electric starter (616 of FIGS. 6 and 9). Fuel source 502 can deliver fuel to engine 504 to spin its rotor shaft directly coupled to generator motor 506 (e.g., as shown in FIG. 7) and applies a force to generator motor 506. The spinning of generator motor 506 generates electricity and the power generated by motor generator 506 is proportional to the power applied by shaft of engine 504. In some examples, a target rotational speed of generator motor 506 is determined based on the KV (rpm/V) of generator motor 506. For example, if a target voltage of 25 Volt DC is desired, the rating of generator motor 506 may be about 400 KV. The rotational speed of the engine 504 may be determined by the following equations:

$$\text{RPM} = \text{KV(RPM/Volt)} \times \text{Target Voltage(VDC)} \quad (2)$$

$$\text{RPM} = 400 \text{ KV} \times 25 \text{ VDC} \quad (3)$$

$$\text{RPM} = 10{,}000 \quad (4)$$

In this example, for generator motor 506 to generate 25 VDC output, the shaft of generator motor 506 coupled to the shaft of engine 504 needs to spin at about 10,000 RPM.

As the load (e.g., one or more motors 516 or one or more of loads 518, 526, 528, and/or 536) is applied to the output of generator motor 506, the voltage output of the micro hybrid generator system 500 will drop, thereby causing the speed of engine 504 and generator motor 506 to be reduced. In some examples, ECU 512 can be used to help regulate the throttle of engine 504 to maintain a consistent output voltage that varies with loads. ECU 512 can act in a manner similar to that of a standard governor for gasoline engines, but instead of regulating an RPM, the ECU 512 can regulate a target voltage output of either or both a bridge rectifier and a generator motor 506 based on a closed loop feedback controller.

Power output from generator motor 506 can be in the form of alternating current (AC) which may need to be rectified by bridge rectifier 508. Bridge rectifier 508 can convert the AC power into direct current (DC) power, as discussed above. In some examples, the output power of the micro hybrid generator system 500 can be placed in a "serial hybrid" configuration, where the generator power output by generator motor 506 may be available to charge the rechargeable battery 510 or provide power to another external load.

In operation, there can be at least two available power sources when the micro hybrid generator system 500 is functioning. A primary source can be from the generator motor 506 through directly from the bridge rectifier and a secondary power source can be from the rechargeable battery 510. Therefore, a combination of continuous power availability and high peak power availability is provided, which may be especially well-suited for UAV applications or portable generator applications. In cases where either primary power source (e.g., generator motor 506) is not available, system 500 can still continue to operate for a short period of time using power from rechargeable battery 510, thereby allowing a UAV to sustain safety strategy, such as an emergency landing.

When micro hybrid generator system 500 is used for UAVs, the following conditions can be met to operate the UAV effectively and efficiently: 1) the total continuous power (watts) can be greater than power required to sustain UAV flight, 2) the power required to sustain a UAV flight is a function of the total weight of the vehicle, the total weight of the hybrid engine, the total weight of fuel, and the total weight of the payload), where:

$$\text{Total Weight(gram)} = \text{vehicle dry weight} + \text{engine weight} + \text{fuel weight} + \text{payload} \quad (5)$$

and, 3) based on the vehicle configuration and aerodynamics, a particular vehicle will have an efficiency rating (grams/watt) of 11, where:

$$\text{Total Power Required to Fly} = \eta \times \text{Weight(gram)} \quad (6)$$

In examples in which the power required to sustain flight is greater than the available continuous power, the available power or total energy may be based on the size and configuration of the rechargeable battery 510. A configuration of the rechargeable battery 510 can be based on a cell configuration of the rechargeable battery 510, a cell rating of the rechargeable battery 510, and/or total mAh of the rechargeable battery 510. In some examples, for a 6S, 16000 mAh, 25 C battery pack, the total energy is determined by the following equations:

$$\text{Total Energy} = \text{Voltage} \times \text{mAh} = 25 \text{ VDC(6S)} \times 16000 \text{ mAh} = 400 \text{ Watt*Hours} \quad (7)$$

$$\text{Peak Power Availability} = \text{Voltage} \times \text{mAh} \times C \text{ Rating} = 25 \text{ VDC} \times 16000 \text{ mAh} \times 25 \text{ C } 10{,}400 \text{ Watts} \quad (8)$$

$$\text{Total Peak Time} = 400 \text{ Watt*Hours}/10{,}400 \text{ Watts} = 138.4 \text{ secs} \quad (9)$$

Further, in some examples, the rechargeable battery 510 may be able to provide 10,400 Watts of power for 138.4 seconds in the event of primary power failure from engine 504. Additionally, the rechargeable battery 510 may be able to provide up to 10,400 Watts of available power for flight or payload needs instantaneous peak power for short periods of time needed for aggressive maneuvers.

The result is micro hybrid generator system 500, when coupled to a UAV, efficiently and effectively provides power to fly and maneuver the UAV for extended periods of time with higher payloads than conventional multi-rotor UAVs. In some examples, the micro hybrid generator system 500 can provide a loaded (e.g., 3 lb. load) flight time of up to about 2 hours 5 minutes, and an unloaded flight time of about 2 hours and 35 minutes. Moreover, in the event that the fuel source runs out or the engine 504 and/or he generator motor 506 malfunctions, the micro hybrid generator system 500 can use the rechargeable battery 510 to provide enough power to allow the UAV to perform a safe landing. In some examples, the rechargeable battery 510 can provide instantaneous peak power to a UAV for aggressive maneuvers, for avoiding objects, or threats, and the like.

In some examples, the micro hybrid generator system 500 can provide a reliable, efficient, lightweight, portable generator system which can be used in both commercial and residential applications to provide power at remote locations away from a power grid and for a micro-grid generator, or an ultra-micro-grid generator.

In some examples, the micro hybrid generator system 500 can be used for an applicable application (e.g., robotics, portable generators, micro-grids and ultra-micro-grids, and the like) where an efficient high energy density power source is desired and where a fuel source is readily available to convert hydrocarbon fuels into useable electric power. The micro hybrid generator system 500 has been shown to be significantly more energy efficient than various forms of rechargeable batteries (Lithium Ion, Lithium Polymer, Lithium Sulfur) and even Fuel Cell technologies typically used in conventional UAVs.

Figure 10:
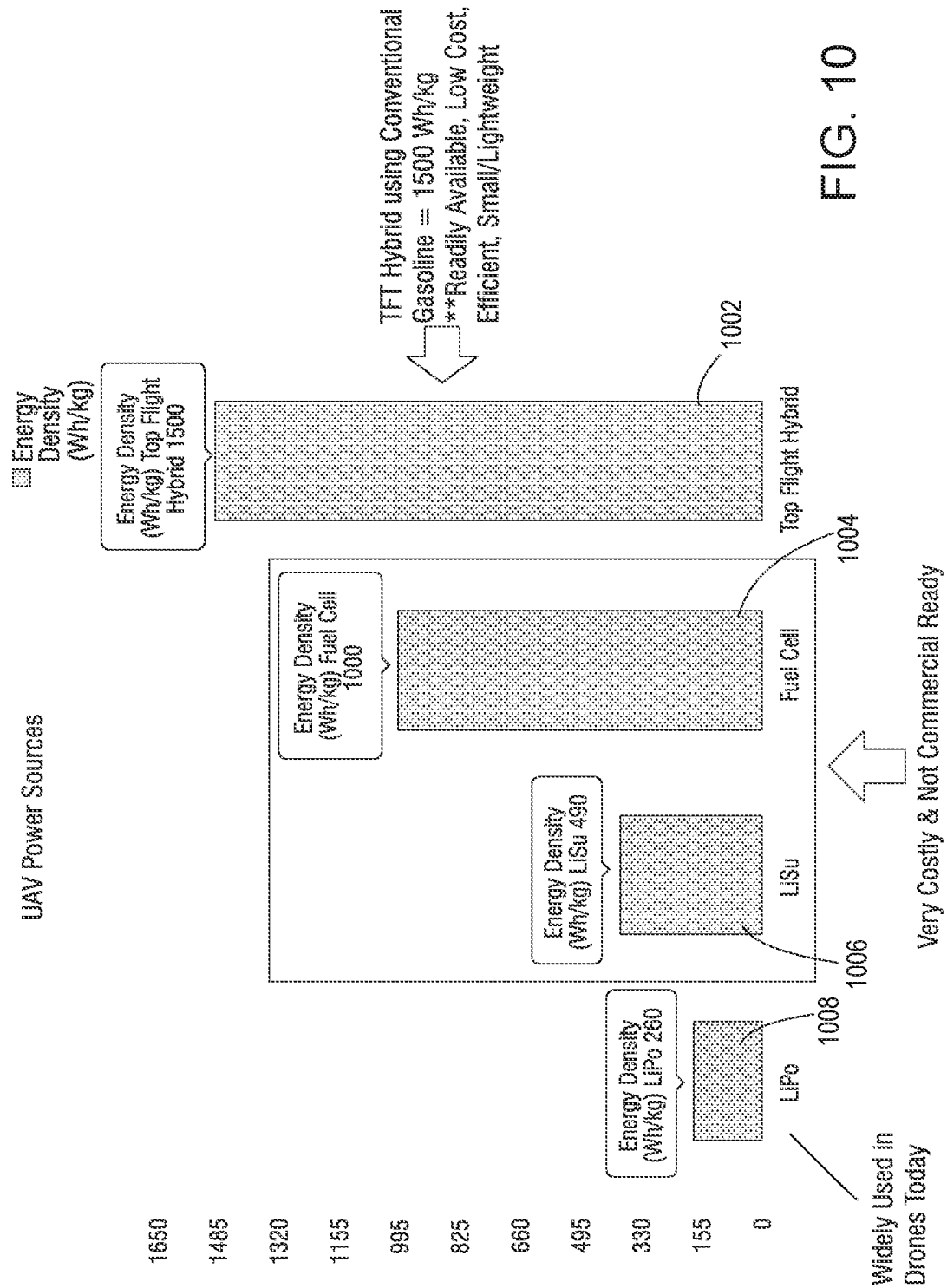
FIG. 10 shows a graph comparing energy density of different UAV power sources.

FIG. 10 shows a graph comparing energy density of different UAV power sources. In some examples, the micro hybrid generator system 500 can use conventional gasoline which is readily available at low cost and provide about 1,500 Wh/kg of power for UAV applications, as indicated at 1002 in FIG. 6. Conventional UAVs which rely entirely on batteries can provide a maximum energy density of about 1,000 Wh/kg when using an energy high density fuel cell technology, as indicated at 1004, about 400 Wh/kg when using lithium sulfur batteries, as indicated at 1006, and about 200 Wh/kg when using a LiPo battery, as indicated at 1008.

Figure 11:
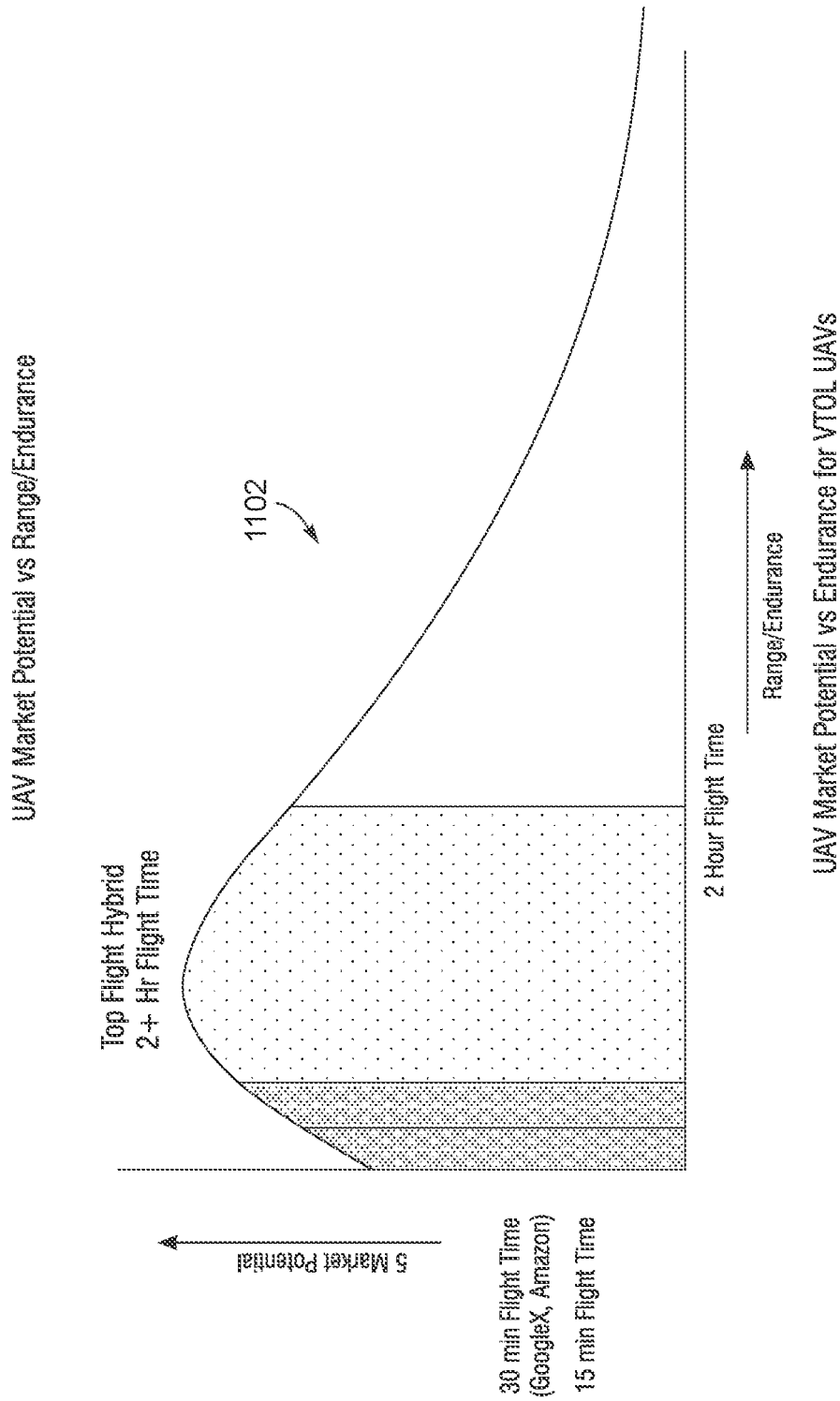
FIG. 11 shows a graph of market potential vs. endurance for an example UAV with an example micro hybrid generator system.

FIG. 11 shows a graph 1104 of market potential for UAVs against flight time for an example two plus hours of flight time micro hybrid generator system 500 when coupled to a UAV is able to achieve and an example of the total market potential vs. endurance for the micro hybrid generator system 500 for UAVs.

In some examples, the micro hybrid generator power systems 500 can be integrated as part of a UAV or similar type aerial robotic vehicle to perform as a portable flying generator using the primary source of power to sustain flight of the UAV and then act as a primary power source of power when the UAV has reached its destination and is not in flight. For example, when a UAV which incorporates the micro hybrid generator power system 500 (e.g., the UAV 900 of FIG. 9) is not in flight, the available power generated by micro hybrid system can be transferred to one or more of external loads 518, 526, 528, and/or 536 such that micro hybrid generator system 500 operates as a portable generator. Micro hybrid system generator 500 can provide continuous peak power generation capability to provide power at remote and often difficult to reach locations. In the "non-flight portable generator mode," micro hybrid system 500 can divert the available power generation capability towards external one or more of loads 518, 526, 528, and/or 536. Depending on the power requirements, one or more of DC-to-AC inverters 522, 532 may be used to convert DC voltage to standard AC power (120 VAC or 240 VAC).

In some examples, micro hybrid generator system 500 coupled to a UAV (e.g., UAV 900 of FIG. 9) will be able to traverse from location to location using aerial flight, land, and switch on the power generator to convert fuel into power.

Figure 12:
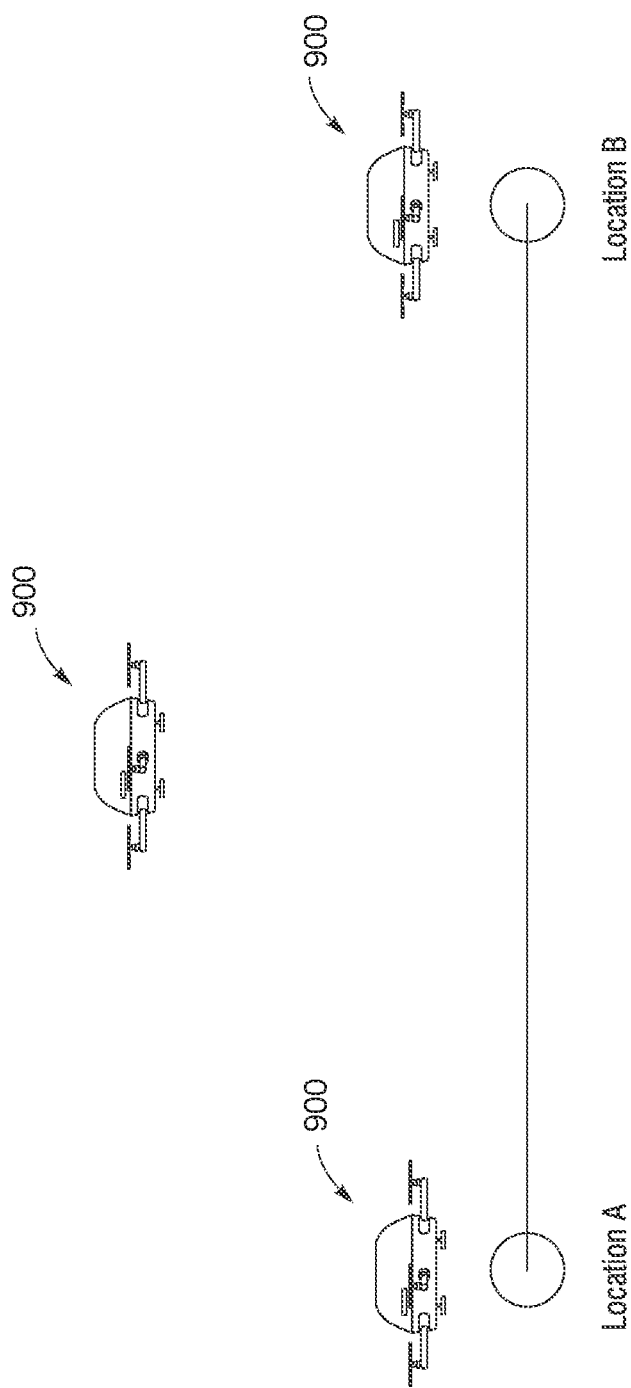
FIG. 12 shows an example flight pattern of a UAV with a micro hybrid generator system.

FIG. 12 shows an example flight pattern of a UAV (e.g., UAV 100 of FIG. 1) with a micro hybrid generator system 500. In the example flight pattern shown in FIG. 12, the UAV 900, with micro hybrid system 500 coupled thereto, begins at location A loaded with fuel ready to fly. The UAV 900 then travels from location A to location B and lands at location B. The UAV 900 then uses micro hybrid system 500 to generate power for local use at location B, thereby acting as a portable flying generator. For example, the UAV 900 can act as a charging station for the UAVs 120 of FIG. 1. When power is no longer needed, the UAV 900 returns back to location A and awaits instructions for the next task.

In some examples, the UAV 900 uses the power provided by micro hybrid generator system 500 to travel from an initial location to a remote location, fly, land, and then generate power at the remote location. Upon completion of the task, the UAV 900 is ready to accept commands for its new task. All of this can be performed manually or through an autonomous/automated process. In some examples, the UAV 900 with micro hybrid generator system 500 can be used in an applicable application where carrying fuel and a local power generator are needed. Thus, the UAV 900 with a micro hybrid generator system 500 eliminates the need to carry both fuel and a generator to a remote location. The UAV 900 with a micro hybrid generator system 500 is capable of powering both the vehicle when in flight, and when not in flight can provide the same amount of available power to external loads. This may be useful in situations where power is needed for the armed forces in the field, in humanitarian or disaster relief situations where transportation of a generator and fuel is challenging, or in situations where there is a request for power that is no longer available, to name a few.

Figure 13:
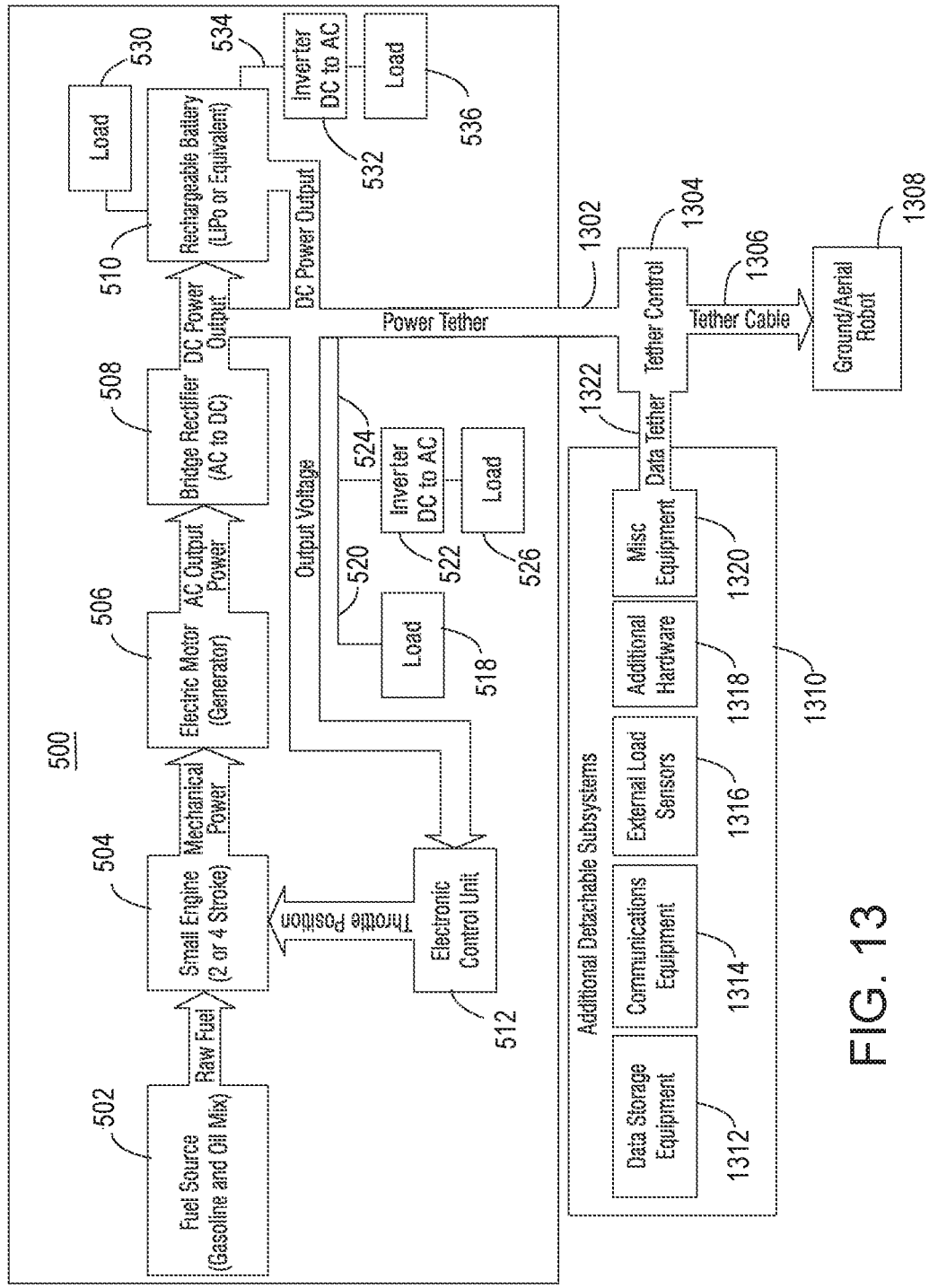
FIG. 13 shows a diagram of a micro hybrid generator system with detachable subsystems.

FIG. 13 shows a diagram of another system for a micro hybrid generator system 500 with detachable subsystems. FIG. 14A shows a diagram of a micro hybrid generator system 500 with detachable subsystems integrated as part of a UAV. FIG. 14B shows a diagram of a micro hybrid generator system 500 with detachable subsystems integrated as part of a ground robot. In some examples, a tether line 1302 is coupled to the DC output of bride rectifier 508 and rechargeable battery 510 of a micro hybrid control system 500. The tether line 1302 can provide DC power output to a tether controller 1304. The tether controller 1304 is coupled between a tether cable 1306 and a ground or aerial robot 1308. In operation, as discussed in further detail below, the micro hybrid generator system 500 provides tethered power to the ground or aerial robot 1308 with the similar output capabilities as discussed above with one or more of the figures included herein, such as UAV 100 of FIG. 1.

The system shown in FIG. 13 can include additional detachable components 1310 integrated as part of the system. For example, the system can include data storage equipment 1312, communications equipment 1314, external load sensors 1316, additional hardware 1318, and various miscellaneous equipment 1320 that can be coupled via data tether 1322 to tether controller 1304.

In some examples of operation of the system shown in FIG. 13, the system may be configured as part of a flying robot or UAV, such as flying robot or UAV (1402 of FIG. 14A or UAV 100 of FIG. 1), or as ground robot 1404. Portable tethered robotic system 1408 may start a mission at location A. All or an applicable combination of the subsystems and ground, the tether controller, ground/aerial robot 1308 can be powered by the micro hybrid generator system 500. The portable tethered robotic system 1408 can travel either by ground (e.g., using ground robot 1404 powered by micro hybrid generator system 500) or by air (e.g., using flying robot or UAV 1402 powered by micro hybrid generator system 500) to desired remote location B. At location B, portable tethered robotic system 1408 configured as flying robot 1402 or ground robot 1404 can autonomously decouple micro hybrid generator system 500 and/or detachable subsystem 1310, indicated at 1406, which remain detached while ground robot 1404 or flying robot or UAV 1402 are operational. When flying robot or UAV 1402 is needed at location B, indicated at 1412, flying robot or UAV 1402 can be operated using power provided by micro hybrid generator system coupled to tether cable 1306. When flying robot or UAV 1402 no longer has micro hybrid generator system 500 and/or additional components 1310 attached thereto, it is significantly lighter and can be in flight for a longer period of time. In some examples, flying robot or UAV 1402 can take off and remain in a hovering position remotely for extended periods of time using the power provided by micro hybrid generator system 500.

Similarly, when ground robot 1404 is needed at location B, indicated at 1410, it may be powered by micro hybrid generator system 500 coupled to tether line 1306 and may also be significantly lighter without micro hybrid generator system 500 and/or additional components 1310 attached thereto. Ground robot 1404 can also be used for extended periods of time using the power provide by micro hybrid generator system 500.

Figure 15:
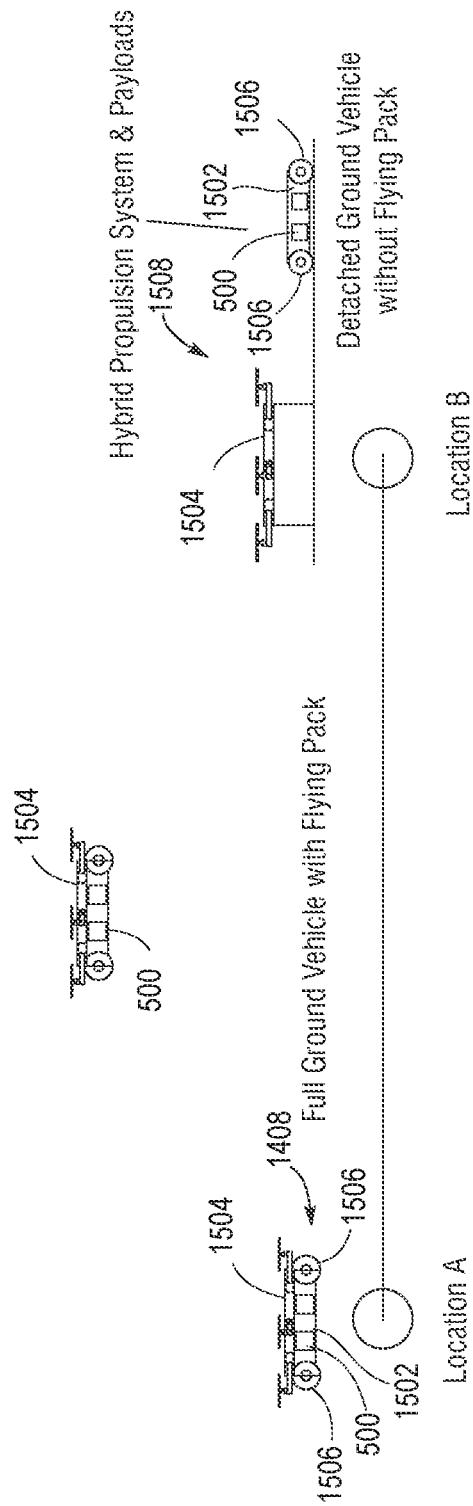
FIG. 15 shows a ground robot with a detachable flying pack in operation.

FIG. 15 shows a ground robot 1502 with a detachable flying pack 1504 in operation. The detachable flying pack 1504 includes micro hybrid generator system 500. The detachable flying pack 1504 is coupled to the ground robot 1502 of one or more embodiments. The micro hybrid generator system 500 is embedded within the ground robot 1502. The ground robot 1502 is detachable from the flying pack 1504. With such a design, a majority of the capability may be embedded deep within the ground robot 1502 which can operate 100% independently of the flying pack 1504. When the ground robot 1502 is attached to the flying pack 1504, the flying pack 1504 may be powered from micro hybrid generator system 500 embedded in the ground robot 1502 and the flying pack 1504 provides flight. The ground robot 1502 platform can be a leg wheel or threaded base motion.

In some examples, the ground robot 1502 may include the detachable flying pack 1504 and the micro hybrid generator system 500 coupled thereto as shown in FIG. 15. In the illustrated example, the ground robot 1502 is a wheel-based robot as shown by wheels 1506. In this example, the micro hybrid generator system 500 includes fuel source 502, engine 504, generator motor 506, bridge rectifier 508, rechargeable battery 20, ECU 512, and optional inverters 522 and 532, as discussed above with reference to one or more figures included herein. The micro hybrid generator system 500 also preferably includes data storage equipment 1312, communications equipment 1314, external load sensors 1316, additional hardware 1318, and miscellaneous communications 1320 coupled to data line 1322 as shown. The flying pack 1504 is preferably an aerial robotic platform such as a fixed wing, single rotor or multi rotor, aerial device, or similar type aerial device.

In some examples, the ground robot 1502 and the aerial flying pack 1504 are configured as a single unit. Power is delivered from micro hybrid generator system 500 and is used to provide power to flying pack 1504, so that ground robot 1502 and flying pack 1504 can fly from location A to location B. At location B, ground robot 1506 detaches from flying pack 1504, indicated at 1508, and is able to maneuver and operate independently from flying pack 1504. Micro hybrid generator system 500 is embedded in ground robot 1502 such that ground robot 1506 is able to be independently powered from flying pack 1504. Upon completion of the ground mission, ground robot 1502 is able to reattached itself to flying pack 1504 and return to location A. All of the above operations can be manual, semi-autonomous, or fully autonomous.

In some examples, flying pack 1504 can traverse to a remote location and deliver ground robot 1502. At the desired location, there may be no need for flying pack 1504. As such, it can be left behind so that ground robot 1502 can complete its mission without having to carry flying pack 1504 as its payload. This may be useful for traversing difficult and challenging terrains, remote locations, and in situations where it is challenging to transport ground robot 1502 to the location. Exemplary applications may include remote mine destinations, remote surveillance and reconnaissance, and package delivery services where flying pack 1504 cannot land near an intended destination. In these examples, a designated safe drop zone for flying pack can be used and local delivery is completed by ground robot 1502 to the destination.

In some examples, upon a mission being completed, ground robot 1404 or flying robot or UAV 1402 can be autonomously coupled back to micro hybrid generator system 500. In some implementations, such coupling is performed automatically upon the mission being completed. Additional detachable components 1310 can be autonomously coupled back micro hybrid generator system 500. Portable tethered robotic system 1408 with a micro hybrid generator system 500 configured a flying robot or UAV 1402 or ground robot 1404 then returns to location A using the power provided by micro hybrid generator system 500.

The result is portable tethered robotic system 1408 with a micro hybrid generator system 500 is able to efficiently transport ground robot 1404 or flying robot or UAV 1402 to remote locations, automatically decouple ground robot 1404 or flying robot or UAV 1402, and effectively operate the flying robot 1402 or ground robot 1404 using tether power where it may be beneficial to maximize the operation time of the ground robot 1402 or flying robot or UAV 1404. System 1408 provides modular detachable tethering which may be effective in reducing the weight of the tethered ground or aerial robot, thereby reducing its power requirements significantly. This allows the aerial robot or UAV or ground robot to operate for significantly longer periods of time when compared to the original capability where the vehicle components are attached and the vehicle needs to sustain motion. System 1408 eliminates the need to assemble a generator, robot and tether at remote locations and therefore saves time, resources, and expense. Useful applications of system 1408 may include, inter alia, remote sensing, offensive or defensive military applications and/or communications networking, multi-vehicle cooperative environments, and the like. In some implementations, one or more sensors of a navigation system (e.g., navigation system 110 of FIG. 1) can be attached to system 1408. The sensors can be configured to interface with portion of an unmanned aerial vehicle highway, such as to facilitate localization, path planning, or other operations of the vehicle.

FIG. 16 shows a control system of a micro hybrid generator system. The micro hybrid generator system includes a power plant 1602 coupled to an ignition module 1604. The ignition module 1604 functions to start the power plant 1602 by providing a physical spark to the power plant 1604. The ignition module 1604 is coupled to an ignition battery eliminator circuit (IBEC) 1606. The IBEC 1606 functions to power the ignition module 1604.

The power plant 1602 is configured to provide power. The power plant 1602 includes an engine and a generator. The power plant is controlled by the ECU 1608. The ECU 1608 is coupled to the power plant through a throttle servo. The ECU 1608 can operate the throttle servo to control a throttle of an engine to cause the power plant 1602 to either increase or decrease an amount of produced power. The ECU 1608 is coupled to a voltage divider 1610. Through the voltage divider 1610, the ECU can determine an amount of power the ECU 1608 is generating to determine whether to increase, decrease, or keep a throttle of an engine constant.

The power plant is coupled to a power distribution board 1612. The power distribution board 1612 can distribute power generated by the power plant 1602 to either or both a battery pack 1614 and a load/vehicle 1616. The power distribution board 1612 is coupled to a battery eliminator circuit (BEC) 1618. The BEC 1618 provides power to the ECU 1608 and a receiver 1620. The receiver 1620 controls the IBEC 1606 and functions to cause the IBEC 1606 to power the ignition module 1604. The receiver 1620 also sends information to the ECU 1608 used in controlling a throttle of an engine of the power plant 1602. The receiver 1620 sends information to the ECU related to a throttle position of a throttle of an engine and a mode in which the micro hybrid generation system is operating.

The power distribution board 1612 is configured to power the navigation system (e.g., navigation system 110 described in relation to FIG. 1). The power distribution board includes one or more voltage regulators that step down the voltage to power one or more sensors of the navigation system. The navigation system can thus draw as much power as needed from the micro hybrid power generator of the UAV.

Figure 17:
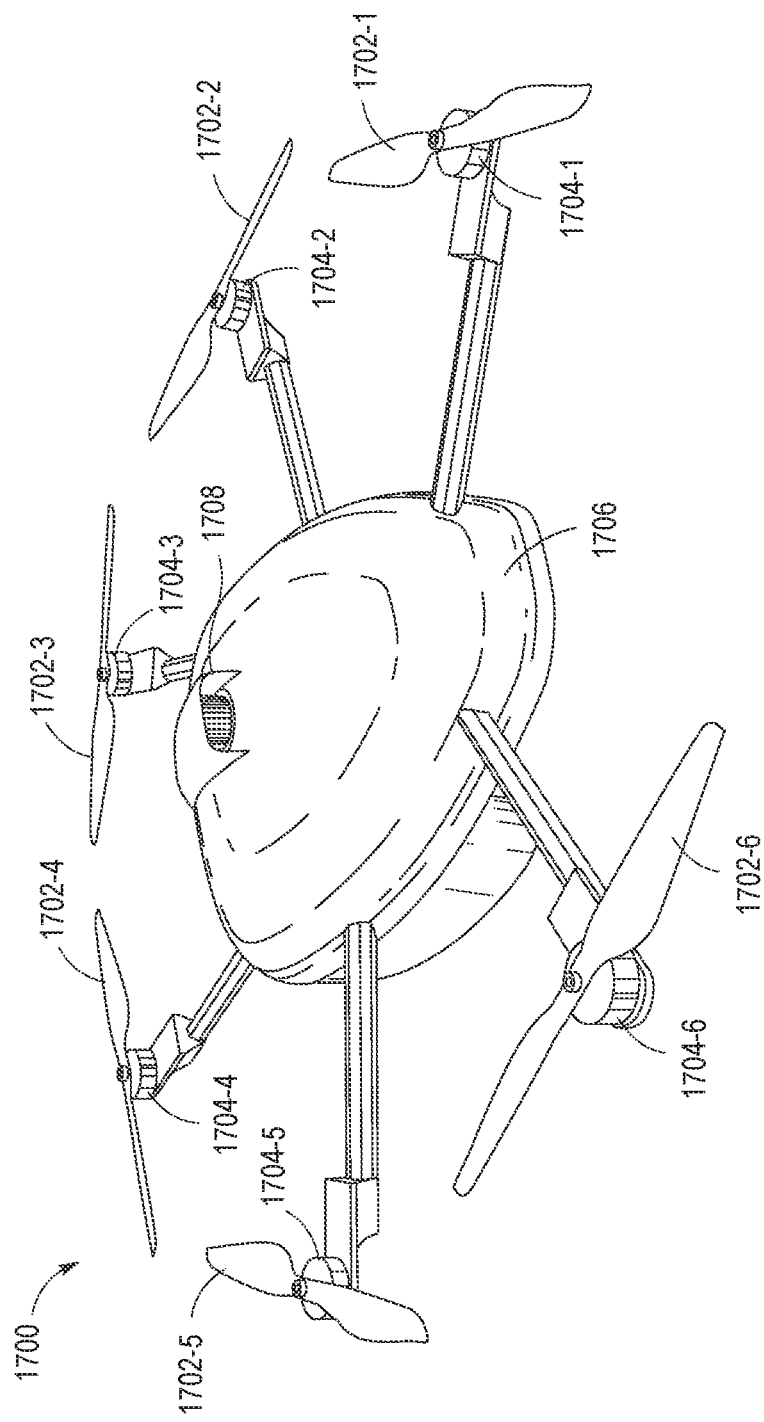
FIGS. 17-19 show diagrams of a UAV.

FIG. 17 shows a top perspective view of a top portion 1700 of a drone powered through a micro hybrid generator system. The top portion 1700 of the drone shown in FIG. 13 includes six rotors 1702-1 through 1702-6 (hereinafter "rotors 1702"). The rotors 1702 are caused to spin by corresponding motors 1704-1 through 1704-6 (hereinafter "motors 1704"). The motors 1704 can be powered through a micro hybrid generator system. The top portion 1700 of a drone includes a top surface 1706. Edges of the top surface 1706 can be curved to reduce air drag and improve aerodynamic performance of the drone. The top surface includes an opening 1708 through which air can flow to aid in dissipating heat away from at least a portion of a micro hybrid generator system. In various embodiments, at least a portion of an air filter is exposed through the opening 1708.

Figure 18:
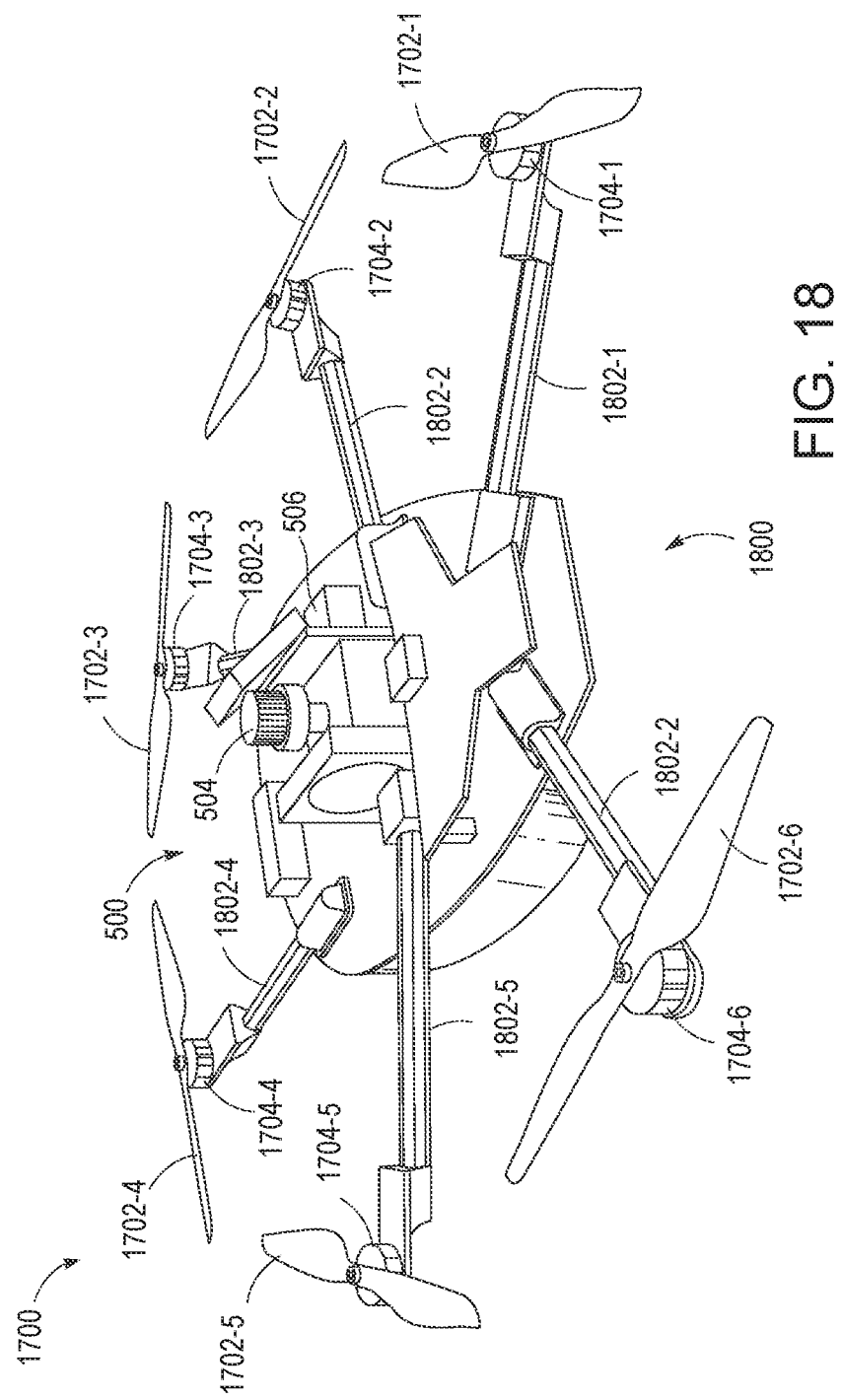

FIG. 18 shows a top perspective view of a bottom portion 1800 of a drone powered through a micro hybrid generator system 500. The micro hybrid generator system 500 includes an engine 504 and a generator motor 506 to provide power to motors 1704. The rotor motors 1704 and corresponding rotors 1702 are positioned away from a main body of a bottom portion 1800 of the drone through arms 1802-1 through 1802-6 (hereinafter "arms 1802"). An outer surface of the bottom portion of the bottom portion 1800 of the drone and/or the arms 1802 can have edges that are curved to reduce air drag and improve aerodynamic performance of the drone.

Figure 19:
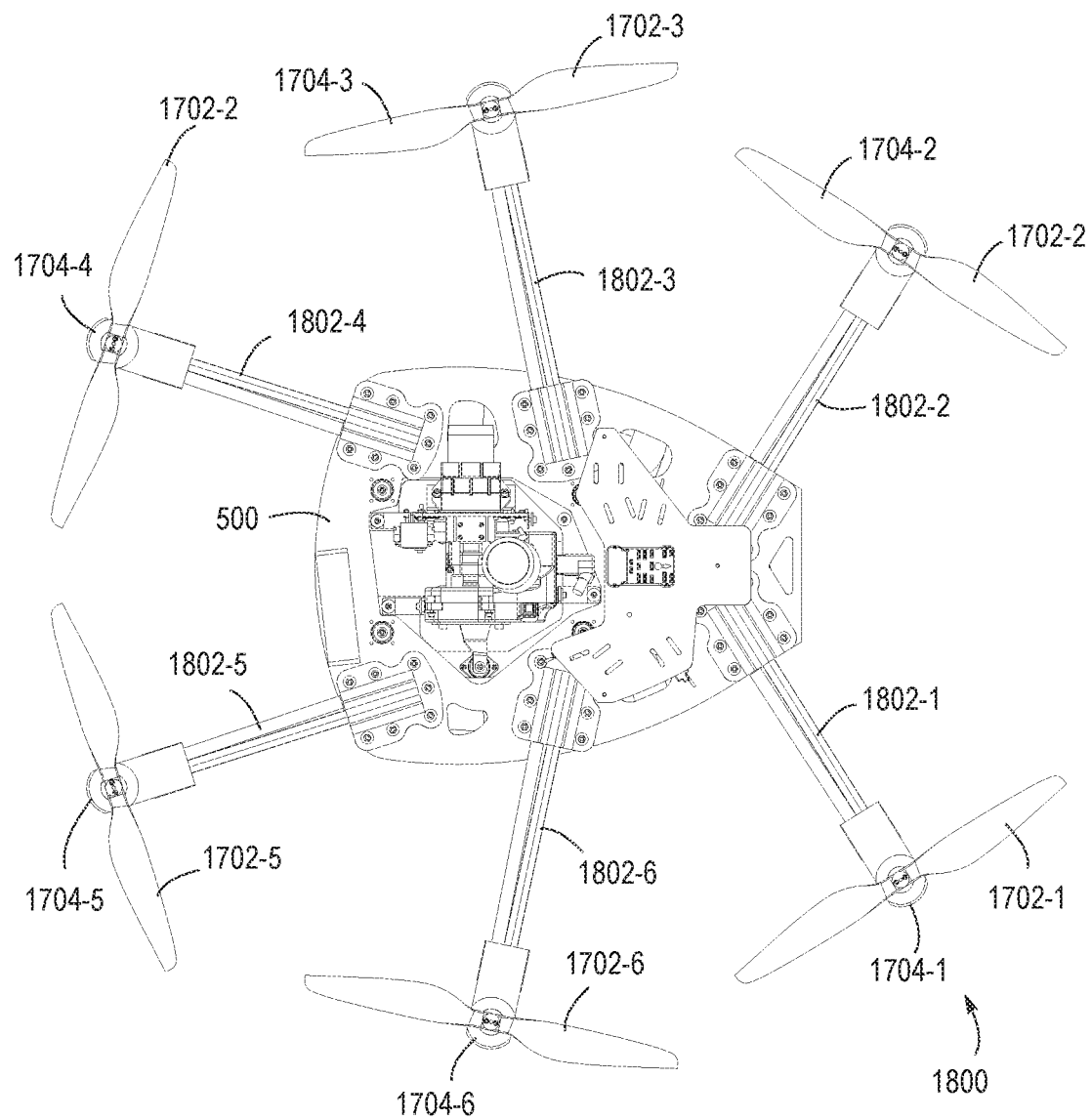

FIG. 19 shows a top view of a bottom portion 1800 of a drone powered through a micro hybrid generator system 500. The rotor motors 1704 and corresponding rotors 1702 are positioned away from a main body of a bottom portion 1800 of the drone through arms 1802. An outer surface of the bottom portion of the bottom portion 1800 of the drone and/or the arms 1802 can have edges that are curved to reduce air drag and improve aerodynamic performance of the drone.

Figure 20:
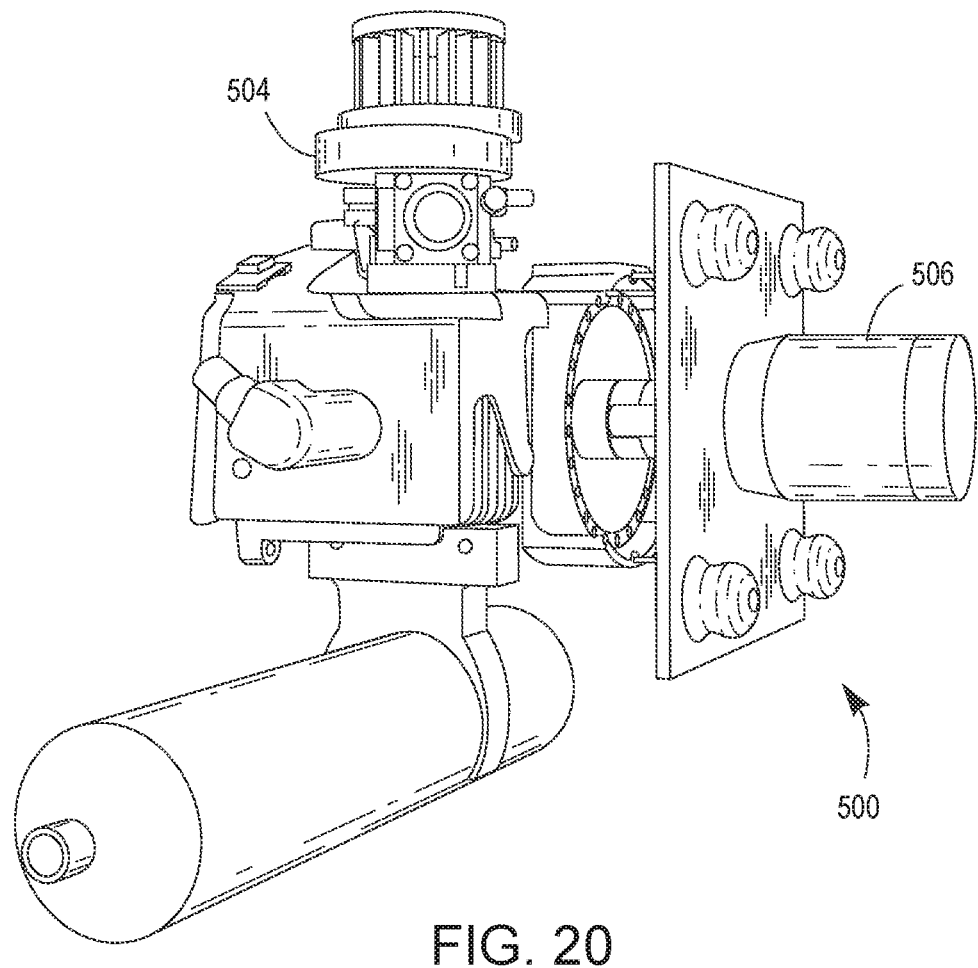
FIGS. 20 and 21 show diagrams of portions of a micro hybrid generator system.

FIG. 20 shows a side perspective view of a micro hybrid generator system 500. The micro hybrid generator system 500 shown in FIG. 16 is capable of providing 1.8 kW of power. The micro hybrid generator system 500 include an engine 504 coupled to a generator motor 506. The engine 504 can provide approximately 3 horsepower. The generator motor 506 functions to generate AC output power using mechanical power generated by the engine 504.

Figure 21:
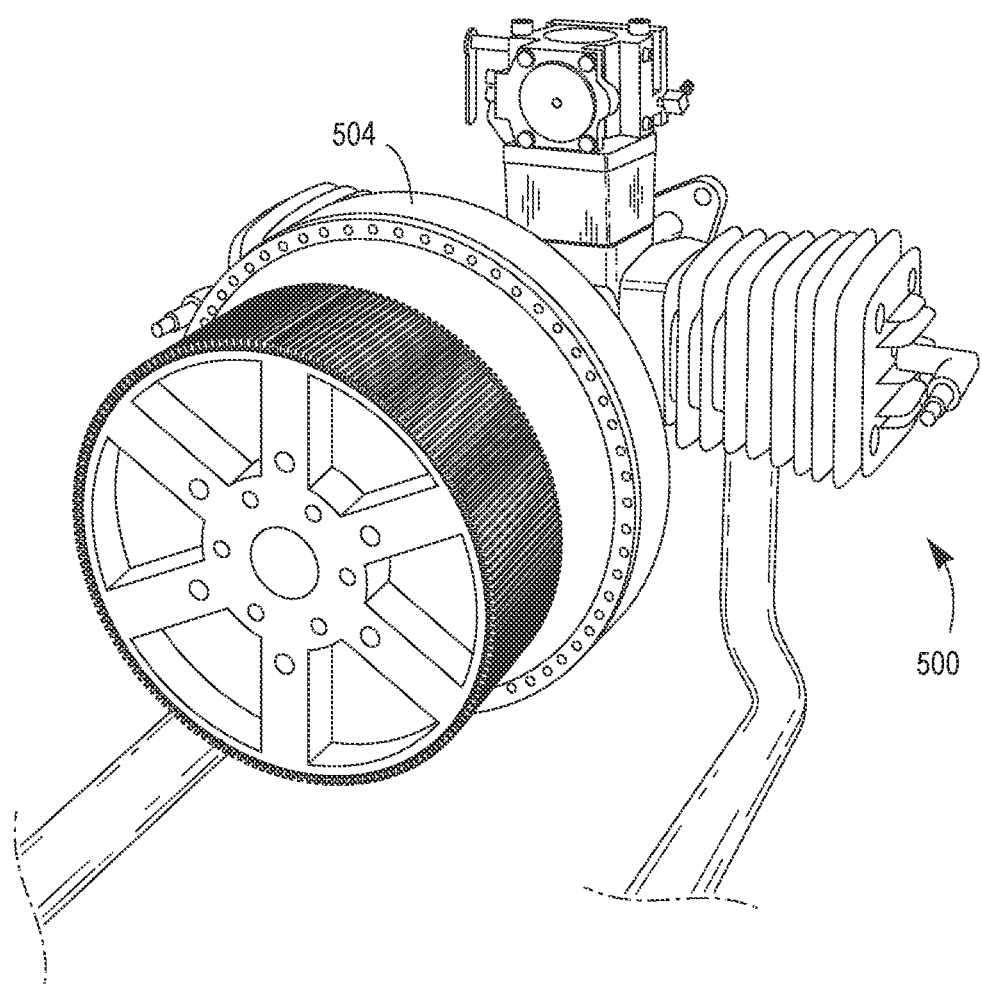

FIG. 21 shows a side perspective view of a micro hybrid generator system 500. The micro hybrid generator system 500 shown in FIG. 17 is capable of providing 10 kW of power. The micro hybrid generator system 500 include an engine 504 coupled to a generator motor. The engine 504 can provide approximately 15-16.5 horsepower. The generator motor functions to generate AC output power using mechanical power generated by the engine 504.

Further description of UAVs and micro hybrid generator systems can be found in U.S. application Ser. No. 14/942,600, filed on Nov. 16, 2015, the contents of which are incorporated here by reference in their entirety.

In some examples, the engine 504 can include features that enable the engine to operate with high power density. The engine 504 can be a two-stroke engine having a high power-to-weight ratio. The engine 504 can embody a simply design with a number of moving parts such that the engine is small and light, thus contributing to the high power-to-weight ratio of the engine. In some examples, the engine may have an energy density of 1 kW/kg (kilowatt per kilogram) and generate about 10 kg of lift for every kilowatt of power generated by the engine. In some examples, the engine 504 can be a brushless motor, which can contribute to achieving a high power density of the engine. A brushless motor is efficient and reliable, and is generally not prone to sparking, thus reducing the risk of electromagnetic interference (EMI) from the engine.

In some examples, the engine 504 is mounted on the UAV via a vibration isolation system that enables sensitive components of the UAV to be isolated from vibrations generated by the engine. Sensitive components of the UAV can include, e.g., an inertial measurement unit such as Pixhawk, a compass, a global positioning system (GPS), or other components.

In some examples, the vibration isolation system can include vibration damping mounts that attach the engine 504 to the frame of the UAV. The vibration damping mounts allow for the engine 504 to oscillate independently from the frame of the UAV, thus preventing vibrations from being transmitted from the engine to other components of the UAV. The vibration damping mounts can be formed from a robust, energy absorbing material such as rubber, that can absorb the mechanical energy generated by the motion of the engine without tearing or ripping, thus preventing the mechanical energy from being transferred to the rest of the UAV. In some examples, the vibration damping mounts can be formed of two layers of rubber dampers joined together rigidly with a spacer. The length of the spacer can be adjusted to achieve a desired stiffness for the mount. The hardness of the rubber can be adjusted to achieve desired damping characteristics in order to absorb vibrational energy.

Figure 22A:
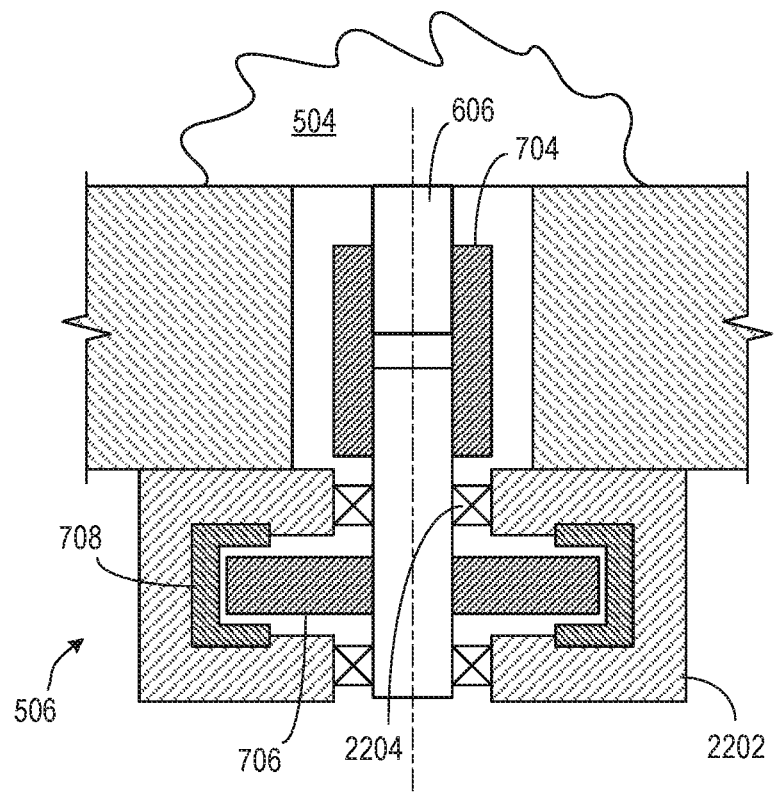
FIGS. 22A and 22B show diagrams of portions of a micro hybrid generator system.

Referring to FIG. 22A, in some examples, the engine 504 and the generator motor 506 are directly coupled through a precise and robust connection (e.g., through a urethane coupling 704). In particular, the generator motor 506 includes a generator rotor 706 and a generator stator 708 housed in a generator body 2202. The generator rotor 706 is attached to the generator body 2202 by generator bearings 2204. The generator rotor 706 is coupled to an engine shaft 606 via the coupling 704. Precision coupling between the engine 504 and the generator motor 506 can be achieved by using precisely machined parts and balancing the weight and support of the rotating components of the generator motor 506, which in turn reduces internal stresses. Alignment of the generator rotor 706 with the engine shaft 606 can also help to achieve precision coupling. Misalignment between the rotor 706 and the engine shaft 606 can cause imbalances that can reduce efficiency and potentially lead to premature failure. In some examples, alignment of the rotor 706 with the engine shaft 606 can be achieved using precise indicators and fixtures. Precision coupling can be maintained by cooling the engine 504 and generator motor 506, by reducing external stresses, and by running the engine 504 and generator motor 506 under steady conditions, to the extent possible. For instance, the vibration isolation mounts allow external stresses on the engine 504 to be reduced or substantially eliminated, assisting in achieving precision direct coupling.

Direct coupling can contribute to the reliability of the first power system, which in turn enables the micro hybrid generator system to operate continuously for long periods of time at high power. In addition, direct coupling can contribute to the durability of the first power system, thus helping to reduce mechanical creep and fatigue even over many engine cycles (e.g., millions of engine cycles). In some examples, the engine is mechanically isolated from the frame of the UAV by the vibration isolation system and thus experiences minimal external forces, so the direct coupling between the engine and the generator motor can be implemented by taking into account only internal stresses.

Direct coupling between the engine 504 and the generator motor 506 can enable the first power system to be a compact, lightweight power system having a small form factor. A compact and lightweight power system can be readily integrated into the UAV.

Figure 22B:
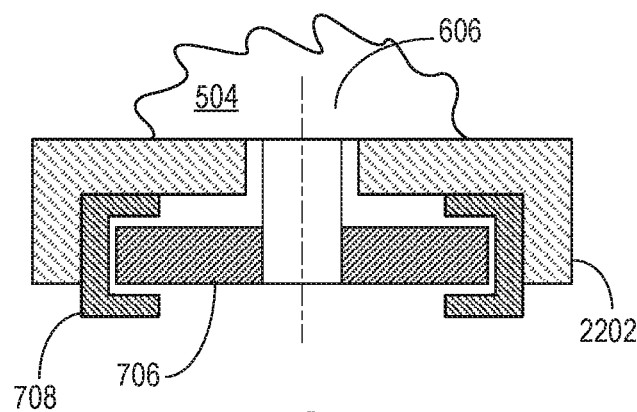

Referring to FIG. 22B, in some examples, a frameless or bearing-less generator 608 can be used instead of a urethane coupling between the generator motor 506 and the engine 504. For instance, the bearings (2204 in FIG. 22A) on the generator can be removed and the generator rotor 706 can be directly mated to the engine shaft 606. The generator stator 708 can be fixed to a frame 610 of the engine 516. This configuration prevents over-constraining the generator with a coupling while providing a small form factor and reduced weight and complexity.

In some examples, the generator motor 506 includes a flywheel that provides a large rotational moment of inertia. A large rotational inertia can result in reduced torque spikes and smooth power output, thus reducing wear on the coupling between the engine 504 and the generator motor 506 and contributing to the reliability of the first power system. In some examples, the generator, when mated directly to the engine 504, acts as a flywheel. In some examples, the flywheel is a distinct component (e.g., if the generator does not provide enough rotary inertia).

In some examples, design criteria are set to provide good pairing between the engine 504 and the generator motor 506. The power band of a motor is typically limited to a small range. This power band can be used to identify an RPM (revolutions per minute) range within which to operate under most flight conditions. Based on the identified RPM range, a generator can be selected that has a motor constant (kV) that is able to provide the appropriate voltage for the propulsion system (e.g., the rotors). The selection of an appropriate generator helps to ensure that the voltage out of the generator will not drop as the load increases. For instance, if the engine has maximum power at 6500 RPM, and a 50 V system is desired for propulsion, then a generator can be selected that has a kV of 130.

In some examples, exhaust pipes can be designed to positively affect the efficiency of the engine 504. Exhaust pipes serve as an expansion chamber for exhaust from the engine, thus improving the volumetric efficiency of the engine. The shape of the exhaust pipes can be tuned to guide air back into the combustion chamber based on the resonance of the system. In some examples, the carburetor can also be tuned based on operating parameters of the engine, such as temperature or other parameters. For instance, the carburetor can be tuned to allow a desired amount of fuel into the engine, thus enabling a target fuel to air ratio to be reached in order to achieve a good combustion reaction in the engine. In addition, the throttle body can be designed to control fuel injection and/or timing in order to further improve engine output.

In some examples, the throttle of the engine can be regulated in order to achieve a desired engine performance. For instance, when the voltage of the system drops under a load, the throttle is increased; when the voltage of the system becomes too high, the throttle is decreased. The bus voltage can be regulated and a feedback control loop used to control the throttle position. In some examples, the current flow into the battery can be monitored with the goal of controlling the charge of the battery and the propulsion voltage. In some examples, feed forward controls can be provided such that the engine can anticipate upcoming changes in load (e.g., based on a mission plan and/or based on the load drawn by the motor) and preemptively compensates for the anticipated changes. Feed forward controls can enable the engine to respond to changes in load with less lag. In some examples, the engine can be controlled to charge the battery according to a pre-specified schedule, e.g., to maximize battery life, in anticipation of loads (e.g., loads forecast in a mission plan), or another goal. Throttle regulation can help keep the battery fully charged, helping to ensure that the system can run at a desired voltage and helping to ensure that backup power is available.

In some examples, ultra-capacitors can be incorporated into the micro hybrid generator system in order to allow the micro hybrid generator system to respond quickly to changing power demands. For instance, ultra-capacitors can be used in conjunction with one or more rechargeable batteries to provide a lightweight system capable of rapid response and smooth, reliable power.

In some examples, thermal management strategies can be employed in order to actively or passively cool components of the micro hybrid generator system. High power density components tend to overheat (e.g., because thermal dissipation is usually proportional to surface area). In addition, internal combustion is an inherently inefficient process, which creates heat.

Figure 23:
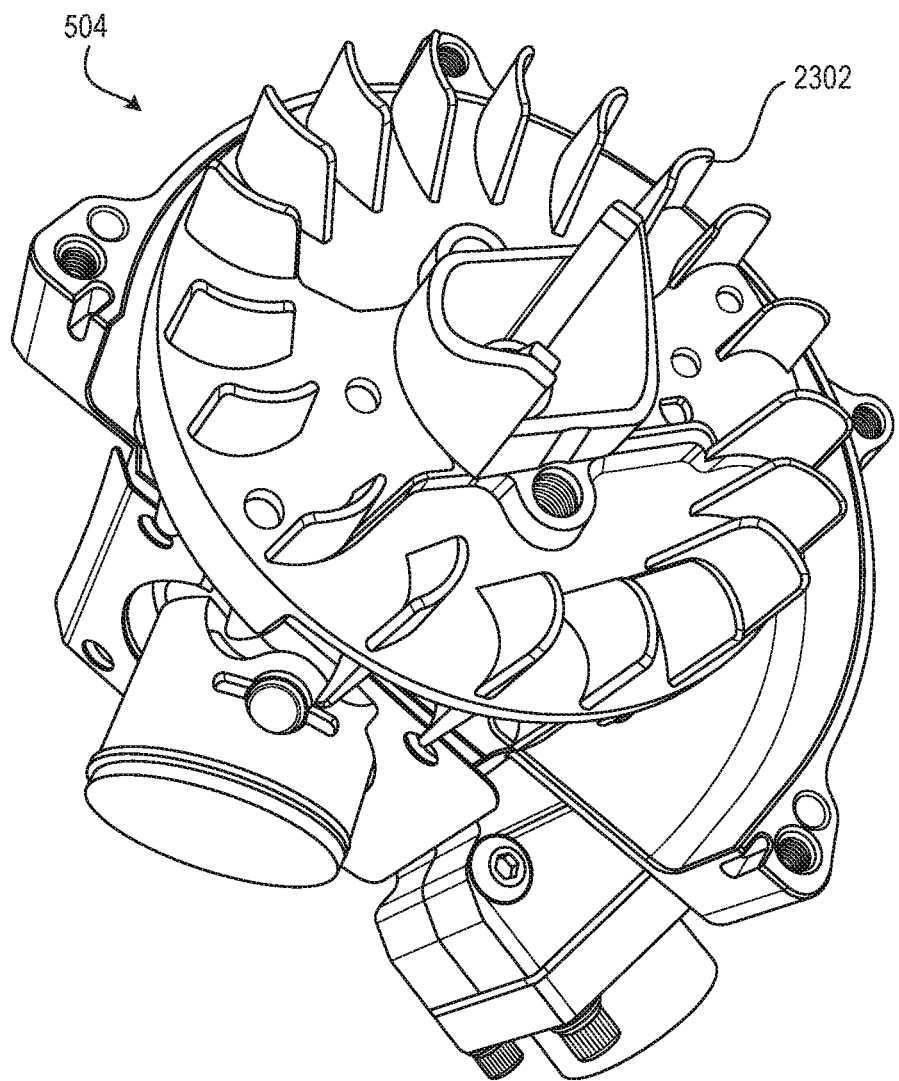
FIG. 23 shows a diagram of a portion of an engine.

Active cooling strategies can include fans, such as a centrifugal fan. The centrifugal fan can be coupled to the engine shaft so that the fan spins at the same RPM as the engine, thus producing significant air flow. The centrifugal fan can be positioned such that the air flow is directed over certain components of the engine (e.g., the hottest parts of the engine) such as the cylinder heads. Air flow generated by the flying motion of the UAV can also be used to cool the micro hybrid generator system. For instance, air pushed by the rotors of the UAV (referred to as propwash) can be used to cool components of the micro hybrid generator system. Passive cooling strategies can be used alone or in combination with active cooling strategies in order to cool components of the micro hybrid generator system. In some examples, one or more components of the micro hybrid generator system can be positioned in contact with dissipative heat sinks, thus reducing the operating temperature of the components. For instance, the frame of the UAV can be formed of a thermally conductive material, such as aluminum, which can act as a heat sink. Referring to FIG. 23, in some examples, fins 2302 can be formed on the engine (e.g., on one or more of the cylinder heads of the engine) to increase the convective surface area of the engine, thus enabling increased heat transfer. In some examples, the micro hybrid generator system can be configured such that certain components are selectively exposed to ambient air or to air flow generated by the flying motion of the UAV in order to further cool the components.

In some examples, the materials of the micro hybrid generator system 500 and/or the UAV can be lightweight. For instance, materials with a high strength to weight ratio can be used to reduce weight. Example materials can include aluminum or high strength aluminum alloys (e.g., 7075 alloy), carbon fiber based materials, or other materials. Component design can also contribute to weight reduction. For instance, components can be designed to increase the stiffness and reduce the amount of material used for the components. In some examples, components can be designed such that material that is not relevant for the functioning of the component is removed, thus further reducing the weight of the component.

While the UAV has been largely described as being powered by a micro hybrid generator system that includes a gasoline powered engine coupled to a generator motor, other types of power systems may also be used. In some implementations, the UAV may be powered at least in part by a turbine, such as a gasoline turbine. For example, a gasoline turbine can be used in place of the gasoline powered engine. The gasoline turbine may be one of two separate power systems included as part of the micro hybrid generator system. That is, the micro hybrid generator system can include a first power system in the form of a gasoline turbine and a second power system in the form of a generator motor. The gasoline turbine may be coupled to the generator motor.

The gasoline turbine may provide higher RPM levels than those provided by a gasoline powered engine (e.g., the engine 504 described above). Such higher RPM capability may allow a second power system (e.g., the generator motor 506 described above) to generate electricity (e.g., for charging the battery 510 described above) more quickly and efficiently.

The gasoline turbine, sometimes referred to as a combustion turbine, may include an upstream rotation compressor coupled to a downstream turbine with a combustion chamber there-between. The gasoline turbine may be configured to allow atmospheric air to flow through the compressor, thereby increasing the pressure of the air. Energy may then be added by applying (e.g., spraying) fuel, such as gasoline, into the air and igniting the fuel in order to generate a high-temperature flow. The high-temperature and high-pressure gas flow may then enter the turbine, where the gas flow can expand down to the exhaust pressure, thereby producing a shaft work output. The turbine shaft work is then used to drive the compressor and other devices, such as a generator (e.g., the generator motor 504) that may be coupled to the shaft. Energy that is not used for shaft work can be expelled as exhaust gases having one or both of a high temperature and a high velocity. One or more properties and/or dimensions of the gas turbine design can be chosen such that the most desirable energy form is maximized. In the case of use with a UAV, the gas turbine will typically be optimized to produce thrust from the exhaust gas or from ducted fans connected to the gas turbines.

Figure 24:
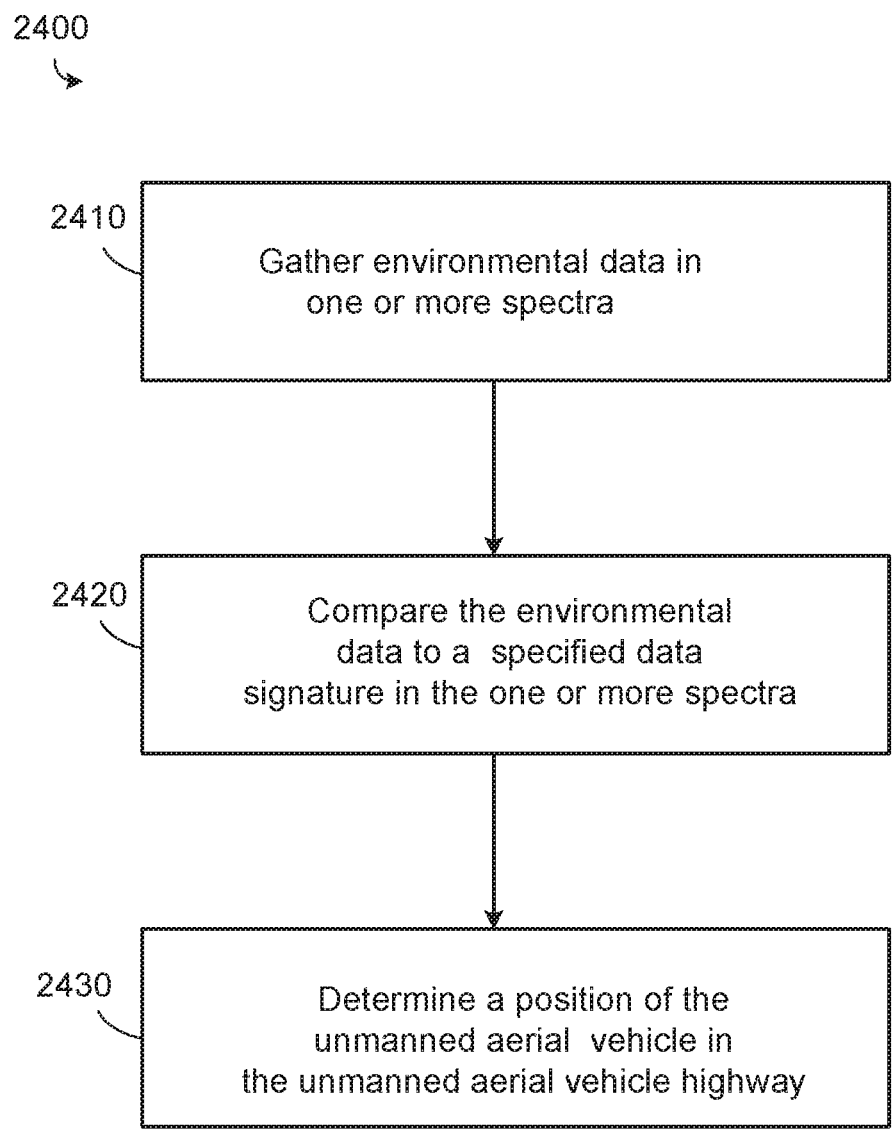
FIG. 24 shows a flowchart of an example process for navigating an unmanned aerial vehicle highway.

FIG. 24 shows an example process 2400 for navigating an unmanned aerial vehicle highway, e.g. by the unmanned aerial vehicle 100. A navigation system (e.g., navigation system 110 of FIG. 1) gathers (2410) environmental data in one or more spectra. As described above, the one or more spectra each can include one of a thermal spectrum, magnetic spectrum, radio waves, infrared waves, visual light, etc. The navigation system compares (2420) the environmental data to a specified data signature in the one or more spectra. The data signature, as described above, includes a recognizable feature of the unmanned aerial vehicle highway that can be used to localize the unmanned aerial vehicle to a position in the unmanned aerial vehicle highway. In some implementations, the data signature is specified in advance of navigation (e.g., stored in a feature library on the unmanned aerial vehicle or on a remote computing system). The data signature can include a particular configuration of data indicates the position of the unmanned aerial vehicle in the unmanned aerial vehicle highway. For example, the data signature can include one of or a combination of an identifier transmitted from a beacon, an image of a landmark, a magnetic field reading, a pattern of thermal emissions, and so forth as described above. The navigation system determines (2420), based on comparing the environmental data to the specified data signature, a position of the unmanned aerial vehicle in the unmanned aerial vehicle highway. For example, the unmanned aerial vehicle may determine that it is near a particular tower of a power line network. In another example, the unmanned aerial vehicle can determine that it is near a particular intersection of a road network. The navigation system can include a neural network that is trained using the specified data signatures. Once the unmanned aerial vehicle recognizes the data signature as being present in the local environment of the unmanned aerial vehicle, a position of the unmanned aerial vehicle can be determined by determining where in the aerial vehicle highway the recognized specified data signature is present.

A number of embodiments have been described. Nevertheless, it will be understood that various modifications may be made without departing from the spirit and scope of the subject matter described herein. Other such embodiments are within the scope of the following claim.

What is claimed is:

1. An unmanned aerial vehicle comprising:
an energy source;
a navigation system powered by energy provided by the energy source, the navigation system configured to:
compare environmental data in one or more spectra to a specified data signature, the specified data signature being associated with an unmanned aerial vehicle highway, the environmental data having been gathered by a sensor of the unmanned aerial vehicle; and
determine, based on the comparison, a position of the unmanned aerial vehicle in the unmanned aerial vehicle highway.

2. The unmanned aerial vehicle of claim 1, wherein the sensor comprises a thermal sensor, and wherein the one or more spectra represent thermal emissions of the unmanned aerial vehicle highway.

3. The unmanned aerial vehicle of claim 1, wherein the sensor comprises one or more of a camera, a ranging sensor, an infrared sensor, and an accelerometer.

4. The unmanned aerial vehicle of claim 1, wherein the navigation system is configured to:
determine that the environmental data correspond to at least a portion of a digital elevation model representing at least a portion of a navigation environment;
determine one or more of an elevation of the unmanned aerial vehicle and a location of the unmanned aerial vehicle relative to a reference point in the digital elevation model; and
map the position of the unmanned aerial vehicle in the unmanned aerial vehicle highway based on i) the one or more of the elevation of the unmanned aerial vehicle and the location of the unmanned aerial vehicle relative to the reference point and ii) a position of the reference point in the unmanned aerial vehicle highway.

5. The unmanned aerial vehicle of claim 1, wherein the unmanned aerial vehicle highway comprises a representation of predefined paths that corresponds to a network of power transmission lines and transmission towers, and wherein the specified data signature comprises data indicative of one of a transmission tower and a power transmission line.

6. The unmanned aerial vehicle of claim 1, wherein the unmanned aerial vehicle highway comprises a representation of predefined paths that corresponds to a road network, and wherein the specified data signature comprises data indicative of at least a portion of a road of the road network.

7. The unmanned aerial vehicle of claim 1, wherein the unmanned aerial vehicle highway comprises a representation of predefined paths that corresponds to a pipeline network, and wherein the specified data signature comprises data indicative of at least a portion of a pipeline of the pipeline network.

8. The unmanned aerial vehicle of claim 1, wherein the one or more spectra comprise multiple spectra, a respective data signature being associated with each spectrum, and wherein the navigation system is configured to:
generate a representation that designates a first position of a first data signature as being associated with a first spectrum of the spectra, and designates a second position of a second data signature as being associated with a second spectrum of the spectra; and
determine the position of the unmanned aerial vehicle in the unmanned aerial vehicle highway based on the designated first position and second position.

9. The unmanned aerial vehicle of claim 1, wherein the navigation system implements a neural network that is trained using a plurality of data signatures from a feature database; and
wherein the navigation system is configured to update the feature database with the gathered environmental data.

10. The unmanned aerial vehicle of claim 1, wherein the navigation system is configured to:
execute a simulation to predict values of subsequently gathered environmental data; and
compare the predicted values of the subsequently gathered environmental data to measured values of subsequently gathered environmental data; and
updating the simulation based on a difference between the predicted values and the measured values.

11. The unmanned aerial vehicle of claim 1, wherein the navigation system is configured to:
receive data indicative of a congested portion of the unmanned aerial vehicle highway; and
plan a path of the unmanned aerial vehicle in the unmanned aerial vehicle highway based on the received data to at least partially avoid the congested portion.

12. The unmanned aerial vehicle of claim 1, wherein the energy source comprises a battery.

13. The unmanned aerial vehicle of claim 12, wherein the battery is configured to be charged by energy generated by an energy generation component, wherein the battery provides electrical energy to the navigation system.

14. The unmanned aerial vehicle of claim 1, wherein one of the energy providing components of the energy system comprises a generator coupled to an engine, the generator configured to generate electrical energy from mechanical energy generated by the engine.

15. The unmanned aerial vehicle of claim 1, wherein the navigation system comprises a global positioning system (GPS) receiver, and wherein the specified data signature includes GPS coordinates.

16. A method for navigating an unmanned aerial vehicle along an unmanned aerial vehicle highway, the method comprising:
gathering, by one or sensors of the unmanned aerial vehicle, environmental data in one or more spectra;
comparing, by a navigation system of the unmanned aerial vehicle, the environmental data to a specified data signature, the specified data signature being associated with an unmanned aerial vehicle highway; and
determining, by the navigation system and based on comparing the environmental data to the specified data signature, a position of the unmanned aerial vehicle in the unmanned aerial vehicle highway.

17. The method of claim 16, comprising:
storing at least a portion of a digital elevation model representing at least a portion of a navigation environment;
determining that the environmental data correspond to the portion of the digital elevation model;
determining one or more of an elevation of the unmanned aerial vehicle and a location of the unmanned aerial vehicle relative to a reference point in the digital elevation model, the reference point of the digital elevation model being a specified position in the unmanned aerial vehicle highway; and
mapping the position of the unmanned aerial vehicle in the unmanned aerial vehicle highway based on i) the one or more of the elevation of the unmanned aerial vehicle and the location of the unmanned aerial vehicle relative to the reference point and ii) the specified position of the reference point in the unmanned aerial vehicle highway.

18. The method of claim 16, wherein one or more spectra comprise multiple spectra, and wherein the method comprises:
generating a representation that designates a first position a first data signature as being associated with a first spectrum of the spectra, and a second position of a second data signature as being associated with a second spectrum of the spectra; and
determining the position of the unmanned aerial vehicle in the unmanned aerial vehicle highway based on the designated first position and second position.

19. The method of claim 16, wherein the navigation system implements a neural network that is trained using a plurality of data signatures from a feature database; and wherein the navigation system is configured to update the feature database with the gathered environmental data.

20. The method of claim 16, comprising:
executing a simulation to predict values of subsequently gathered environmental data; and
comparing the predicted values of the subsequently gathered environmental data to measured values of subsequently gathered environmental data; and
updating the simulation based on a difference between the predicted values and the measured values.

21. The method of claim 16, comprising:
receiving data indicative of a congested portion of the unmanned aerial vehicle highway; and
planning a path of the unmanned aerial vehicle in the unmanned aerial vehicle highway based on the received data to at least partially avoid the congested portion.

* * * * *